US006580071B2

(12) United States Patent
Weinberger et al.

(10) Patent No.: US 6,580,071 B2
(45) Date of Patent: Jun. 17, 2003

(54) METHOD FOR CALIBRATING A MASS SPECTROMETER

(75) Inventors: Scot R. Weinberger, Montara, CA (US); Edward J. Gavin, Santa Clara, CA (US); Michael G. Youngquist, Palo Alto, CA (US)

(73) Assignee: Ciphergen Biosystems, Inc., Fremont, CA (US)

( * ) Notice: Subject to any disclaimer, the term of this patent is extended or adjusted under 35 U.S.C. 154(b) by 0 days.

(21) Appl. No.: 10/194,452

(22) Filed: Jul. 11, 2002

(65) Prior Publication Data

US 2003/0062473 A1 Apr. 3, 2003

Related U.S. Application Data

(60) Provisional application No. 60/305,119, filed on Jul. 12, 2001.

(51) Int. Cl.[7] ............................ A01J 49/40; A01J 49/00
(52) U.S. Cl. ....................................... 250/287; 250/282
(58) Field of Search ................................. 250/282, 287

(56) References Cited

U.S. PATENT DOCUMENTS 4,495,413 A * 1/1985 Lerche et al. ............ 250/252.1
4,583,183 A 4/1986 Winiecki et al.
4,847,493 A * 7/1989 Sodal et al. ............. 250/252.1
4,933,547 A * 6/1990 Cody, Jr. ..................... 250/282
5,886,345 A * 3/1999 Koster et al. ............... 250/287
6,204,500 B1 3/2001 Whitehouse et al.
6,353,324 B1 3/2002 Uber, III et al.
6,365,893 B1 * 4/2002 Le Cocq ..................... 250/287
6,498,340 B2 * 12/2002 Anderson et al. ........... 250/282
2002/0094116 A1 7/2002 Frost et al.

* cited by examiner

*Primary Examiner*—John R. Lee
*Assistant Examiner*—Johnnie L Smith, II
(74) *Attorney, Agent, or Firm*—Townsend, Townsend & Crew LLP

(57) ABSTRACT

A method for calibrating a time-of-flight mass spectrometer is disclosed. The method includes determining the time-of-flight values, or values derived from the time-of-flight values for a calibration substance at each of a plurality of different addressable locations on a sample substrate. Then, one of the addressable locations on the substrate is identified as a reference addressable location. A plurality correction factors are then calculated for the respective addressable locations on the substrate using the time-of-flight value, or a value derived from the time-of-flight value.

21 Claims, 16 Drawing Sheets

METHOD FOR CALIBRATING A MASS SPECTROMETER

CROSS-REFERENCE TO RELATED APPLICATIONS

This application claims the benefit of the filing date of U.S. Provisional Application No. 60/305,119, filed Jul. 12, 2001. This application is herein incorporated by reference in its entirety.

BACKGROUND OF THE INVENTION

A time-of-flight mass spectrometer is an analytical device that determines the molecular weight of chemical compounds by separating corresponding molecular ions according to their mass-to-charge ratio (m/z value). In time-of-flight mass spectrometry (tofms), ions are formed by inducing the creation of a charge by typically adding or deleting a species such as a proton, electron, or metal. After the ions are formed, they are separated by the time it takes for the ions to arrive at a detector. These detection times are inversely proportional to the square root of their m/z values. Molecular weights are subsequently determined using the m/z values once the nature of the charging species has been elucidated.

FIG. 1 shows a simplified schematic diagram of a laser desorption/ionization time-of-flight mass spectrometer. For simplicity of illustration, some components (e.g., an analog-digital converter) are not shown in FIG. 1. The mass spectrometer includes a laser 20 (or other ionization source), a sample substrate 26, and a detector 36 (also known as the analyzer). A number of analytes are at different addressable locations 26(*a*), 26(*b*) on the sample substrate 26. The detector 36 faces the sample substrate 26 so that the detector 36 receives ions of the analytes from the sample substrate 26. An extractor 28 and one or more ion lenses 32 are between the detector 36 and the sample substrate 26. The region between the ion lenses 32 and the detector 36 is enclosed in a vacuum tube and is typically maintained at pressures less than 1 microtorr.

In operation, the laser 20 emits a laser beam 21 that is focused by a lens 22. A mirror 24 then reflects the focused laser beam and directs the focused laser beam to the sample substrate 26. The laser beam 21 initiates the ionization process of the analytes at a predetermined addressable location 26(*a*) on the sample substrate 26. As a result, the analytes at the addressable location 26(*a*) form analyte ions 34. The analyte ions 34 subsequently desorb off of the sample substrate 26.

The sample substrate 26 and the extractor 28 are coupled to a high-voltage supply 30 and are both at high voltage. The last of the ion lenses 32 is at ground. Applied potentials to each of these elements collectively create an ion focusing and accelerating field used to gather formed ions and accelerate them through the analyzer to ultimately strike the detector. The detector 36 then receives and detects the ions 34.

The time it takes for the ions 34 to pass from the sample substrate 26 to the detector 36 is proportional to the mass of the ions 34. This is the "time-of-flight" of the ions 34. As will be explained in detail below, time-of-flight values are used to determine the m/z values for the analyte ions 34, and consequently the molecular weights of the analytes ionized.

After the analyte at the addressable location 26(*a*) is analyzed, the sample substrate 26 is repositioned upward so that an analyte on an adjacent addressable location 26(*b*) can receive the laser beam 21. This process is repeated until all analytes at all addressable locations on the substrate 26 are ionized and the m/z values for the analyte ions are determined.

Although the above-described mass spectrometer can accurately determine the m/z values of analyte ions, systematic errors are present in the m/z values. One factor that can cause systematic errors is the change in the electrical field strength that accelerates the ions 34. The change in position of the sample substrate 26, which is at high voltage, alters the ion extraction electrical field strength. The changing electrical field strength modifies the acceleration of the ions and consequently the time-of-flight values for the ions. Errors in the time-of-flight values for the analyte ions translate into errors in the obtained m/z values.

A user can calibrate the mass spectrometer to correct for the errors. Two calibration strategies are typically employed: external standard calibration and internal standard calibration.

In an external calibration process, a calibration substance is ionized on the sample substrate. The calibration substance is adjacent to the analyte to be analyzed and has a known mass and ions of a known m/z value. The obtained time-of-flight value for the calibration substance may be used to correct the time-of-flight value of the analyte. A more accurate m/z value can be calculated from the corrected time-of-flight value.

While the external calibration process is effective in some instances, a number of improvements could be made. For example, the calibration substance takes up space on the substrate surface that could otherwise be used for an analyte. This decreases the number of analytes per sample substrate that can be analyzed and consequently decreases the throughput of the analytical process. The throughput is also decreased, because time-of-flight measurements are made for a number of calibration substances. Time that could be otherwise used to process analytes is spent processing the calibration substances. Furthermore, forming discrete deposits of calibration substances on each sample substrate takes time and resources. Moreover, in this conventional process, the calibration substance and the analyte are spatially separated from each other. The substrate is still repositioned between the ionization of the analyte and the ionization of the calibration substance. Although error is reduced, a small amount of error is present because the repositioning of the substrate between the ionization of the calibration substance and the adjacent analyte may introduce changes in the accelerating electrical field strength.

Another calibration process is the internal standard calibration process. In an internal standard calibration process, a sample having an analyte is spiked with at least one calibration substance. The calibration substance has a known m/z value and is present at the same addressable location on the sample substrate as the analyte. Both the calibration substance and the analyte ionize and desorb simultaneously. The time-of-flight value for the ionized calibration substance can be used to correct the time-of-flight value for the ionized analyte. The internal calibration approach typically provides about a 10–100 fold improvement in mass accuracy compared to external standard approaches.

However, a number of problems are associated with the use of internal calibration substances. For example, if the calibration substance has a mass that is close to the mass of the unknown analyte, the signal from the calibration substance can "mask" the signal for the ions of the unknown analyte. As a result, the signal for the unknown analyte may not be observed. Also, if the ionization potential of the calibration substance exceeds the ionization potential of the analyte, the formation of analyte ions can be suppressed. Because of the difficulties of applying internal standard calibration approaches, external standard measurements are employed most routinely.

Embodiments of the invention address these and other problems.

SUMMARY OF THE INVENTION

Embodiments of the invention are directed to methods for calibrating mass spectrometers, mass spectrometers, and computer readable media including computer code for calibrating mass spectrometers.

One embodiment of the invention is directed to a method for calibrating a time-of-flight mass spectrometer, the method comprising: a) determining time-of-flight values, or values derived from the time-of-flight values for a calibration substance at each of a plurality of different addressable locations on a sample substrate; b) identifying one of the addressable locations on the substrate as a reference addressable location; and c) calculating a plurality correction factors for the respective addressable locations on the substrate using the time-of-flight value, or a value derived from the time-of-flight value, for the calibration substance on the reference addressable location, wherein each correction factor corrects the time-of-flight value, or the value derived from the time-of-flight value, for the calibration substance on an addressable location within the plurality of addressable locations with respect to the reference addressable location.

Another embodiment of the invention is directed to a method of using correction factors in a time-of-flight mass spectrometry process, the method comprising: a) determining time-of-flight values, or values derived from the time-of-flight values, for analyte substances at each of addressable locations on a second sample substrate; b) retrieving correction factors from memory, wherein the correction factors are formed by i) determining time-of-flight values for a calibration substance at each of a first plurality of addressable locations on a first sample substrate, ii) identifying one of the first plurality of addressable locations on the first sample substrate as a reference addressable location, and iii) calculating a plurality correction factors for the respective addressable locations on the first sample substrate using the time-of-flight value, or a value derived from the time-of-flight value, for the calibration substance on the reference addressable location, wherein each correction factor corrects the time-of-flight value, or the value derived from the time-of-flight value, for the calibration substance on an addressable location within the first plurality of addressable locations with respect to the reference addressable location; and c) applying the correction factors to the time-of-flight values, or the values derived from the time-of-flight values, for the analyte substances at the second plurality of addressable locations on the second sample substrate.

Another embodiment of the invention is directed to a TOF mass spectrometer comprising: a) an ionization source that generates ionized particles; b) an ion detector with a detecting surface that detects the ionized particles and generates a signal in response to the detection of ionized particles; c) a digital converter adapted to convert the signal from the ion detector into a digital signal; d) a triggering device operatively coupled to the digital converter, wherein the triggering device starts a time-period for measuring a time associated with the flight of the ionized particles to the ion detector, e) a digital computer coupled to the digital converter, wherein the digital computer is adapted to process the digital signal from the digital converter; and f) a memory coupled to the digital computer, the memory storing correction factors.

Another embodiment of the invention is directed to a computer readable medium comprising: a) code for determining time-of-flight values for a calibration substance at each of a plurality of different addressable locations on a sample substrate; b) code for identifying one of the addressable locations on the sample substrate as a reference addressable location; and c) code for calculating a plurality correction factors for the respective addressable locations on the substrate using the time-of-flight value, or a value derived from the time-of-flight value, for the calibration substance on the reference addressable location, wherein each correction factor corrects the time-of-flight value, or the value derived from the time-of-flight values, for the calibration substance on an addressable location within the plurality of addressable locations with respect to the reference addressable location.

Another embodiment of the invention is directed to a method for calibrating a time-of-flight mass spectrometer, the method comprising: a) determining time-of-flight values, or values derived from the time-of-flight values for a calibration substance at each of a plurality of different addressable locations on a sample substrate; b) identifying one of the addressable locations on the substrate as a reference addressable location; c) calculating a first plurality correction factors for the respective addressable locations on the substrate using the time-of-flight value, or a value derived from the time-of-flight value, for the calibration substance on the reference addressable location, wherein each correction factor in the first plurality of correction factors corrects the time-of-flight value, or the value derived from the time-of-flight value, for the calibration substance on an addressable location within the plurality of addressable locations with respect to the reference addressable location; d) forming a function using the first plurality of correction factors; and e) estimating a second plurality of correction factors using the function.

Another embodiment of the invention is directed to a computer readable medium comprising: a) code for determining time-of-flight values for a calibration substance at each of a plurality of different addressable locations on a sample substrate; b) code for identifying one of the addressable locations on the sample substrate as a reference addressable location; c) code for calculating a first plurality correction factors for the respective addressable locations on the substrate using the time-of-flight value, or a value derived from the time-of-flight value, for the calibration substance on the reference addressable location, wherein each correction factor in the first plurality of correction factors corrects the time-of-flight value, or the value derived from the time-of-flight values, for the calibration substance on an addressable location within the plurality of addressable locations with respect to the reference addressable location; d) code for forming a function using the first plurality of correction factors; and e) code for estimating a second plurality of correction factors using the function.

These and other embodiments of the invention are described in further detail below.

DETAILED DESCRIPTION

Time of flight mass spectrometry (TOFMS) is an analytical process that determines the mass-to-charge ratio (m/z) of an ion by measuring the time it takes a given ion to travel a fixed distance after being accelerated to a constant final velocity. There are two fundamental types of time of flight mass spectrometers: those that accelerate ions to a constant final momentum and those that accelerate ions to a constant final energy. Because of various fundamental performance parameters, constant energy TOF systems are preferred.

Figure 1:
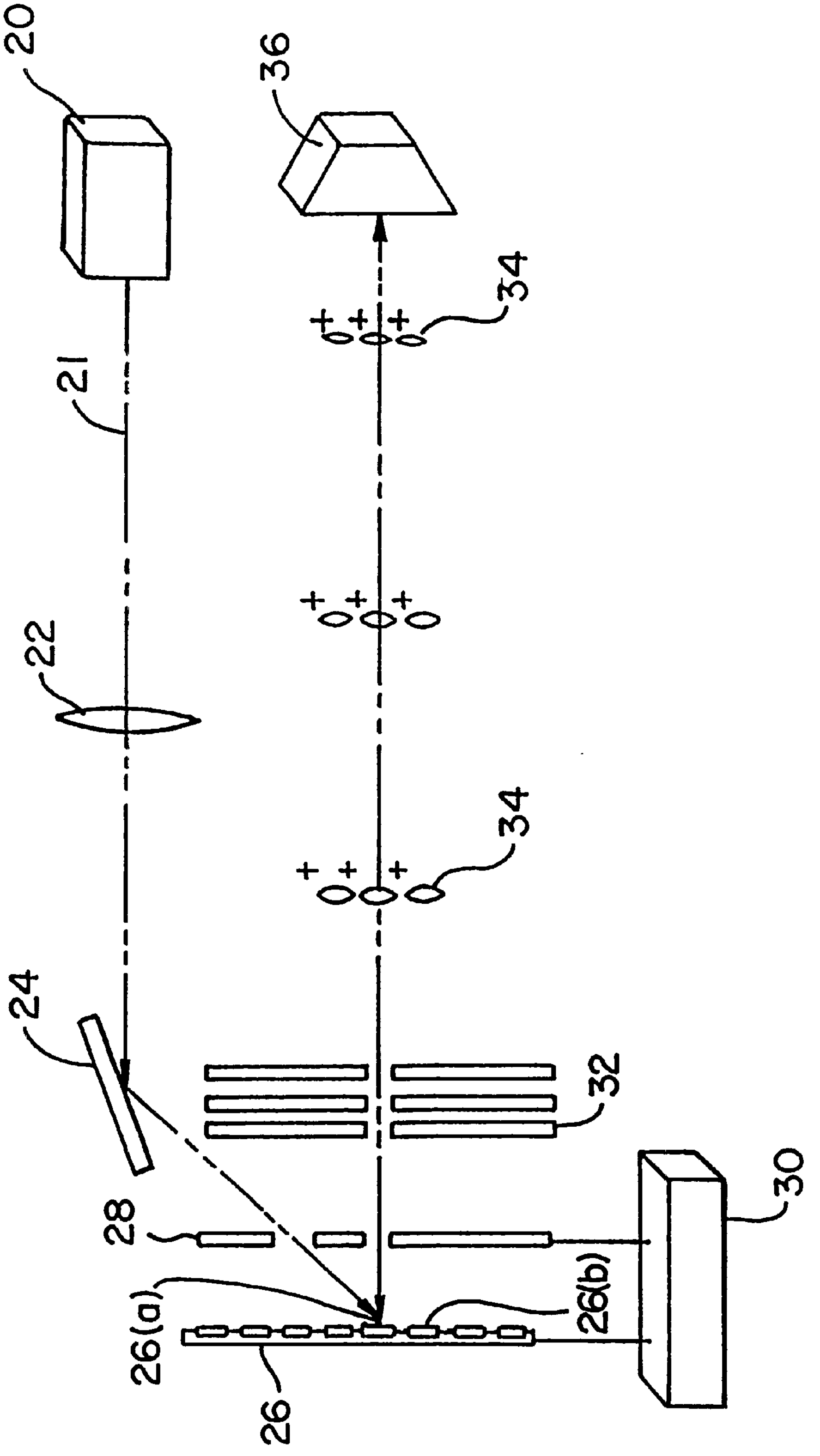
FIG. 1 is a schematic diagram of a mass spectrometer that uses a laser to create and desorb ions.
Figure 2:
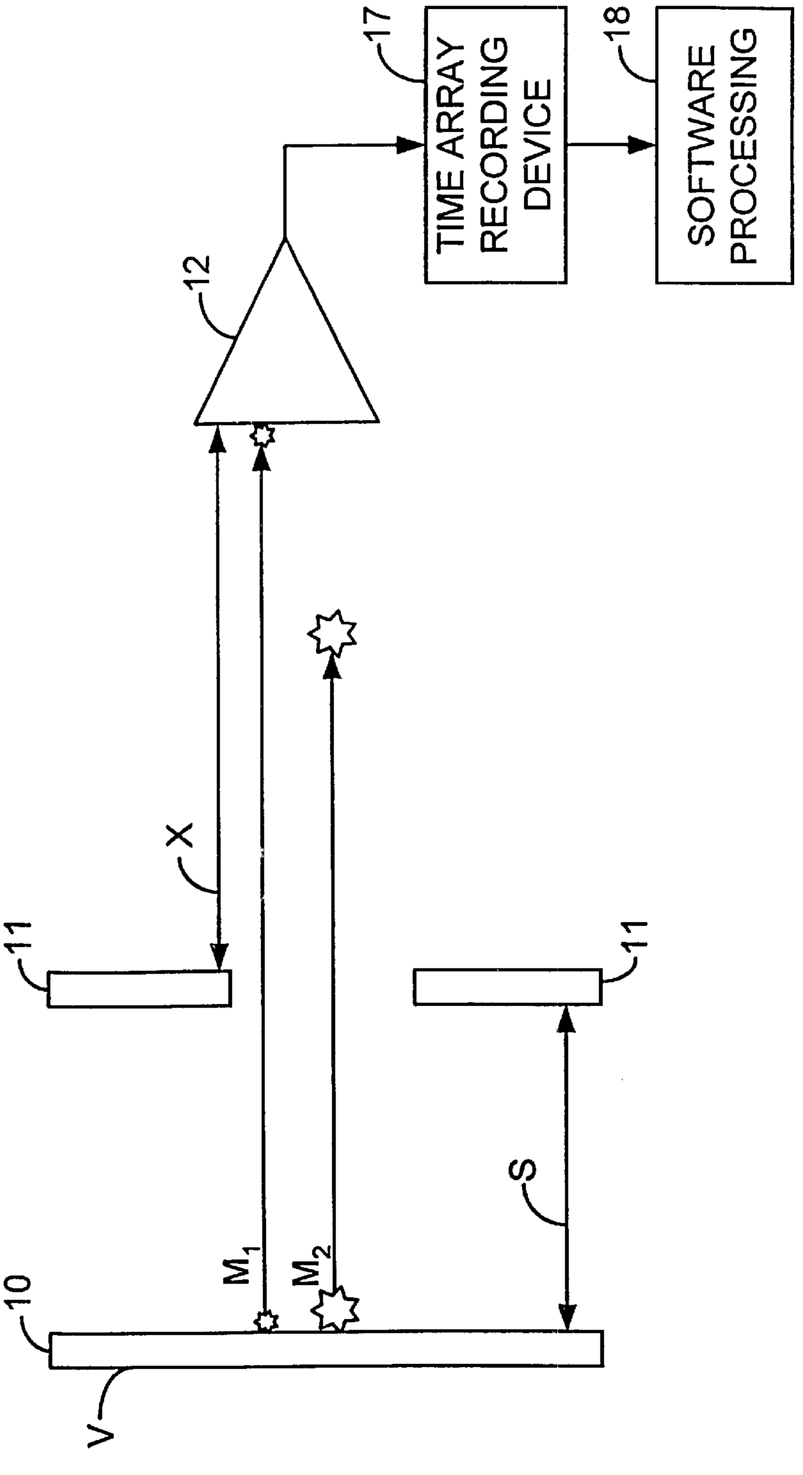
FIG. 2 shows a parallel extraction time of flight mass spectrometer.

A schematic diagram of a constant kinetic energy TOF mass spectrometer is shown in FIG. 2. In this example, ions are created in a region typically referred to as the ion source. Two ions with masses $M_1$ and $M_2$ have been created as shown in FIG. 2. A uniform electrostatic field created by the potential difference between repeller lens 10 and ground aperture 11 accelerates ions $M_1$ and $M_2$ through a distance s (the substrate to extractor distance). After acceleration, ions pass through ground aperture 11 and enter an ion drift region where they travel a distance x at a constant final velocity prior to striking ion detector 12. A time array-recording device 17 and software processing 18 are coupled to the ion detector 12.

The time of flights of the ions can be measured to calculate their mass-to-charge ratios. Referring to FIG. 2, within the ion optic assembly, accelerating electrical field (E) is taken to be the potential difference (V) between the two lens elements (10 and 11) as applied over acceleration distance s, (E=V/s). Equation (1) defines the final velocity (v) for ion $M_1$ with charge z. The final velocity of ion $M_2$ is determined in a similar manner.

$$v = \left(\frac{2sEz}{M_1}\right)^{1/2} \tag{1}$$

Inverting equation (1) and integrating with respect to distance s yields equation (2), which describes the time spent by ion $M_1$ in the acceleration region ($t_s$)

$$t_s = \left(\frac{M_1}{2Esz}\right)^{1/2}(2s) \tag{2}$$

The total time of flight for ion $M_1$ ($t_t$) is then derived by adding $t_s$ to the time spent during flight along distance x (the ion drift region). Time $t_s$ equals the product of the length of free flight distance x with 1/v, as shown in Equation (3).

$$t_t = \left(\frac{M_1}{2Esz}\right)^{\frac{1}{2}}(2s+x)^2 \tag{3}$$

Rearranging equation (3) in terms of $M_1/z$ yields equation (4)

$$\frac{M_1}{z} = \frac{2t_t^2 Es}{(2s+x)^2} \tag{4}$$

For all TOFMS systems, E, s, and x are intentionally held constant during analysis, thus equation (4) can be reduced to equation (5).

$$\frac{M_1}{z} = kt_t^2 \tag{5}$$

In equation (5), k is a constant that depends on the acceleration field strength E, the substrate to extractor distance s, and the free flight distance of the ion x with mass $M_1$ and charge z. In equation (5), it is normally assumed that the value of the acceleration field strength E (i.e., embedded in the constant k) is constant. However, as noted above, slight changes in E are present, for example, when a sample substrate is moved. Accordingly, in practice, the value of k changes slightly and is not constant thus translating into errors in the calculated m/z values. Embodiments of the invention can compensate for the changes to k, thus making the obtained m/z values more accurate.

The present inventors have determined that appropriate corrections for time-of-flight value (or values derived from time-of-flight values) errors caused by changes in the electrical field that accelerates detected ions in a mass spectrometer are independent of the mass of the ions. This is not necessarily intuitive as one might expect that error corrections could depend on the mass of the ions. As described in further detail below, in embodiments of the invention, correction factors can be used to correct time-of-flight values, or values derived from time-of-flight values. In some embodiments, each correction factor can be created by obtaining the ratio of the time-of-flight value for a calibration substance at a particular addressable location to the time-of-flight value for the calibration substance at a reference addressable location. If one looks at the ratio of different times-of-flight values such as, for example, $t_1$ and $t_2$, at different acceleration field strengths $E_1$ and $E_2$, respectively, the effective ratio created ($t_1/t_2$) is independent of mass (the mass terms in the numerator and denominator cancel out). Hence, a single correction factor created using a calibration substance ion of a given mass can be applied to correct for errors for ions having different masses.

The correction factors can correct systematic time-of-flight and m/z value errors in a mass spectrometer. Such systematic errors can be caused by the re-positioning of a sample substrate during processing. As noted above, a sample substrate is repositioned in a mass spectrometer so that different analytes at the different addressable locations on the sample substrate can be processed. Repositioning the sample substrate, which is at high voltage, causes changes in the accelerating field that accelerates the ions. Changes in the accelerating field affect the time-of-flight values, and the values derived from the time-of-flight values (e.g., m/z values), determined by the mass spectrometer. In embodiments of the invention, the time-of-flight values, or values derived from the time-of-flight values, for analyte ions are corrected with the correction factors so that more accurate time-of-flight values and/or more accurate m/z values for the analyte ions are obtained.

Because corrections to the errors are independent of mass, a single set of correction factors can be created for a plurality of addressable locations on a substrate using a calibration substance having a known m/z value. The set of correction factors can be used to correct for time-of-flight values, or values derived from the time-of-flight values, for other analyte ions with different m/z values. For example, a set of correction factors for a first plurality of addressable locations on a first sample substrate can be created using a calibration substance that has a mass of 100 Daltons. The correction factors can be applied to uncorrected time-of-flight values for analytes on a second plurality of addressable locations on a second sample substrate. Errors in the uncorrected time-of-flight values can be corrected using the correction factors. For example, the analytes on the second plurality of addressable locations may have masses above or below 100 Daltons (e.g., 500 or 1000 Daltons). The set of correction factors can also be used to correct errors in the time-of-flight values associated with subsequently processed analytes on third, fourth, etc. sample substrates of similar geometry and with similarly positioned addressable locations.

In embodiments of the invention, a "calibration substance" includes a substance that is used to form correction factors. The correction factors are used to correct for errors such as errors in time-of-flight values in a mass spectrometry process. A calibration substance has a known mass and generally a known m/z value. An "analyte" refers to one or more components of a sample that are desirably retained and detected. Examples of analytes and calibration substances include chemical compounds and biological compounds. Examples of biological compounds include biological macromolecules such as peptides, proteins, nucleic acids, etc. Sometimes, the calibration substance and the analyte are the same type of material (e.g., both peptides).

Methods including forming correction factors using time-of-flight values and applying the correction factors to uncorrected time-of-flight values are discussed in detail. However, it is understood that correction factors can also be created using higher order values. The higher order values are derived from time-of-flight values. Thus, in embodiments of the invention, "values derived from the time-of-flight values" include any suitable value obtained from a time-of-flight value including higher order values such as mass-to-charge ratio values. Correction factors based on such higher order values can be applied to similar, uncorrected, higher order values to form corrected higher order values. Examples of such higher order values include mass-to-charge ratio values. As will be explained below, correction factors can be created using mass-to-charge ratio values. The correction factors can then be applied to uncorrected mass-to-charge ratio values to form corrected mass-to-charge ratio values.

In embodiments of the invention, a correction factor is created for each addressable location on a sample substrate using one or more calibration substances on each addressable location. Each "addressable location" on a sample substrate can refer to a location that is positionally distinguishable from other areas on the sample substrate. The sample substrate contains a plurality of the addressable locations, and one of the addressable locations can be designated as the reference addressable location for the sample substrate.

Correction factors for each addressable location are calculated using the time-of-flight values, or values derived from the time-of-flight values, for the calibration substance at the reference addressable location. Each correction factor can be unitless and corrects a time-of-flight value, or a value derived from the time-of-flight value (e.g., an m/z value), for the calibration substance on a particular addressable location with respect to the reference addressable location. The correction factors may be derived using experimental data. Once created, each correction factor can be used to correct time-of-flight values, or values derived from time-of-flight values, for one or more analytes on an addressable location with respect to the reference addressable location. Correcting time-of-flight values, or values derived from the time-of-flight values, substantially eliminates the variance in the values caused by changes to the accelerating electrical field strength.

Preferably, the same set of correction factors can be used for many sample substrates, because the mass spectrometer stores the correction factors in memory. These correction factors may be retrieved by a digital computer as often as desired to correct for errors in time-of-flight values, or values derived from time-of-flight values. Unlike conventional methods, the mass spectrometer not need be re-calibrated with a calibration substance for every subsequently processed sample substrate. Of course, the user may calibrate the mass spectrometer as often as desired to compensate for any drift in other factors of the mass spectrometer over time.

In a typical process of using the correction factors, after the correction factors are stored in memory, a user may insert a sample substrate with analytes on it into the mass spectrometer. Respective addressable locations on the sample substrate can have the same or different analytes. The nature and the quantity of the analytes may be unknown to the user before processing the analytes. Each analyte at each addressable location can be ionized, desorbed, and detected. After the analyte ions are detected, a mass spectrum signal is formed and the time-of-flight values for the analytes can be determined. The time-of-flight values can be raw or processed time-of-flight values.

After retrieving the correction factors from memory, the correction factors can be applied to the uncorrected time-of-flight values (or values derived from the time-of-flight values) to form corrected time-of-flight values. In applying the correction factors, any suitable mathematical operation may be performed on the mass spectrum signal or any information obtained from the mass spectrum signal to obtain corrected time-of-flight values.

When applying a correction factor to a time-of-flight value, or a value derived from the time-of-flight value, the correction factors may be applied to an entire mass spectrum signal so that each data point forming the mass spectrum signal is corrected with the correction factor. In these embodiments, the entire mass spectrum signal may be shifted by an amount proportional to the magnitude of the correction factor. Alternatively, only the peaks in the mass spectrum signal can be corrected with a correction factor. Peaks corresponding to analytes in a mass spectrum signal may be first identified and the correction factors may be applied to only those peaks, and not noise in the mass spectrum signal. Corrected time-of-flight values may then be obtained from the corrected mass spectrum signal. In yet another alternative embodiment, uncorrected time-of-flight values can be determined from an uncorrected mass spectrum signal produced according to a conventional process. Correction factors can then be applied to the uncorrected time-of-flight values to form corrected time-of-flight values. These latter embodiments require fewer computational resources (e.g., computing time and computer power) as the correction factors need not be applied to signal components such as noise. Various ways of applying the correction factors to time-of-flight values are described in greater detail below.

Regardless of how the correction factors are applied, accurate time-of-flight values and/or accurate m/z values are obtained. If desired, a continuous mass spectrum signal with peaks corresponding to the corrected m/z values can be generated by the mass spectrometer. As known by those skilled in the art, the intensities of signals at the m/z values in the mass spectrum are generally proportional to the abundance of the analytes ionized.

Embodiments of the invention have a number of advantages. For example, in embodiments of the invention, errors associated with the different addressable locations on a substrate are determined before analyzing analytes on a sample substrate. Correction factors associated with each addressable location on a substrate can be determined once, and then stored in memory. The correction factors can then be applied to time-of-flight values, or values derived from time-of-flight values, for analyte ions from addressable locations on other sample substrates. Because the corrections to the time-of-flight values (or values derived from the time-of-flight values) are independent of the mass of the ions detected, the correction factors can correct time-of-flight value errors for analyte ions having masses different than the mass of the calibration substance. Also, since the correction factors are stored in memory, calibration substances need not be present along with the analytes on the surface of a substrate with the analytes. This results in improved throughput as a calibration substance need not be ionized for each and every set of analytes, and for each sample substrate. Embodiments of the invention are also cost effective as calibration substances need not be deposited on each and every substrate. Moreover, internal calibration substances need not be used along with the analytes being analyzed. Accordingly, in embodiments of the invention, the problems associated with using internal calibration substances are eliminated.

Furthermore, the correction factors employed in embodiments of the invention are associated with the exact addressable locations on the substrate. Unlike conventional external standard calibration methods described above, the correction factors are not based on a calibration substance that is spatially separated from the actual addressable location of the analyte being ionized. Rather, the correction factors are based on the actual addressable locations of the analytes on the sample substrate. As a result, the time-of-flight values and the corresponding m/z values of the ionized analytes are highly accurate and precise.

Precise m/z values are desirable. For example, by having precise m/z values, differential expression studies can be conducted with increased confidence. In a typical example of a differential expression study, mass spectra are obtained for a normal biological sample (e.g., non-cancer) and a diseased biological sample (e.g., cancer). A difference in the concentrations of an analyte (e.g., a protein) in the respective samples can be observed by viewing differences in the height of a signal (i.e., "peaks") at a common m/z value. Such studies can be used in, among other things, diagnostic processes, and processes for discovering potential biomarkers whose presence, absence or concentration may indicate the presence, absence, or state of a disease.

Accurate m/z values are also desirable. For example, accurate m/z values are used when identifying proteins based upon mass spectrometry analysis of a fragment population of a protein (i.e., a pool of peptides generated from the protein either chemically or enzymatically). As known by those of ordinary skill in the art, under these conditions, accurate m/z assignments for these fragments are very useful in facilitating database mining to identify the protein of interest.

Figure 3:
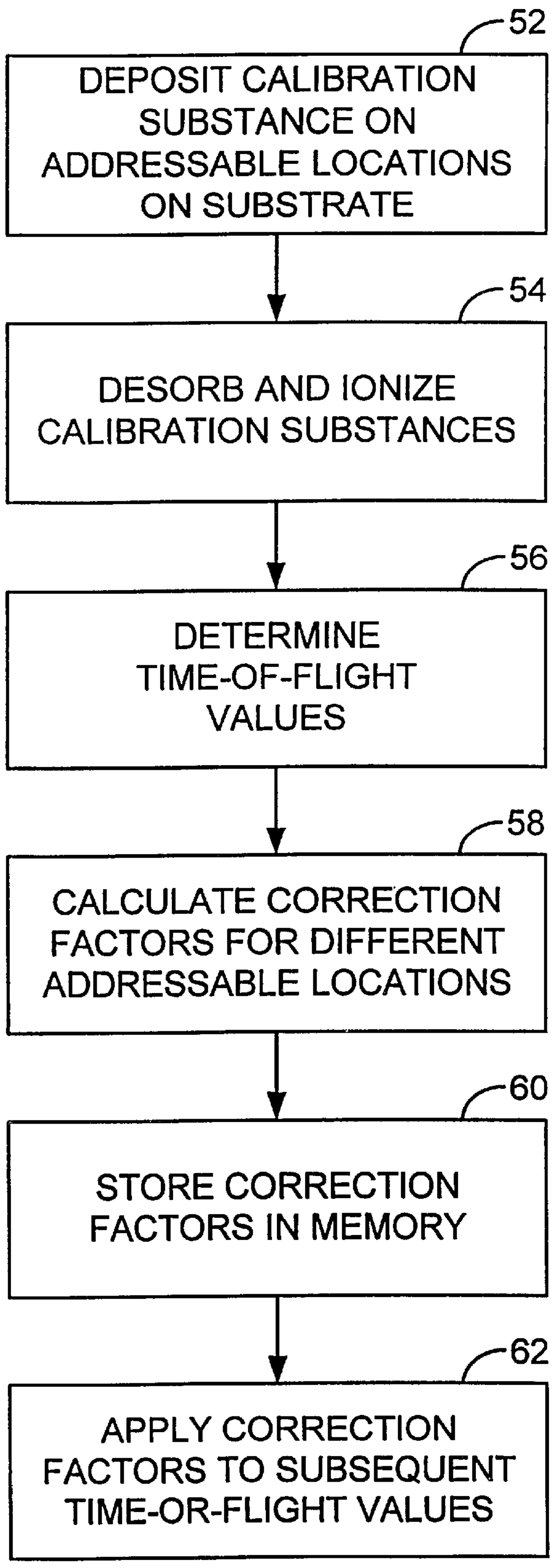
FIG. 3 shows a flow chart illustrating some of the steps used in a calibration method according to an embodiment of the invention.

Embodiments of the invention can be described with reference to FIG. 3, which shows a flowchart illustrating a process according to an embodiment of the invention. First, a calibration substance (e.g., human insulin) is deposited at different addressable locations on a substrate (step 52). In some embodiments, the sample substrate may be referred to as a "sample probe". The sample substrate may be made of any suitable material including metals such as stainless steel, aluminum, or may be coated with a precious metal such as gold. After the calibration substance is on the addressable locations on the sample substrate, the sample substrate is inserted into a mass spectrometer and the calibration substance at each of the different addressable locations is desorbed and ionized (step 54). The mass spectrometer determines time-of-flight values for the ionized calibration substance at each of the different addressable locations on the substrate (step 56). These time-of-flight values are used to calculate correction factors for each of the respective addressable locations on the substrate (step 58). After calculating the correction factors, the mass spectrometer stores the correction factors in memory (step 60). The mass spectrometer then applies the correction factors to subsequent time-of-flight values of analyte ions desorbed from similar addressable locations on other sample substrates to create corrected time-of-flight values (step 62). The mass spectrometer can also generate a mass spectrum signal with corrected m/z values. Each of these steps in this specific embodiment is described in further detail below.

One or more calibration substances are deposited at each of several addressable locations on the substrate (step 52). Each calibration substance has a known m/z value. For example, the calibration substance may be human insulin that is deposited at 10 different addressable locations on the sample substrate. Human insulin has a known average molecular mass value of about 5807.6533 Daltons.

In some embodiments of the invention, each addressable location on the sample substrate can include two or more calibration substances at each addressable location. For example, both human insulin and Hirudin BHVK (average molecular mass ≈7033.6136 Da) can be present at each addressable location on the sample substrate. When forming the correction factors, the mass spectrometer determines the time-of-flight values for both of these calibration substances. Time-of-flight values for both calibration substances are taken into account when calculating a correction factor for an addressable location. As a result, more accurate correction factors are produced. As will be explained in further detail below, correction factors calculated for each respective calibration substance at a given addressable location on the substrate can be averaged (or manipulated by some other statistical process) to form an average correction factor for that addressable location. Averaging correction factors reduces the effects of random error in the finally determined correction factor. One may also evaluate the spread of the correction factors forming the average correction factor to determine if the random error associated with forming the correction factor exceeds a predetermined tolerance level (such as the error associated with time-of-flight errors caused by changes in the accelerating electrical field strength, E).

Figure 4:
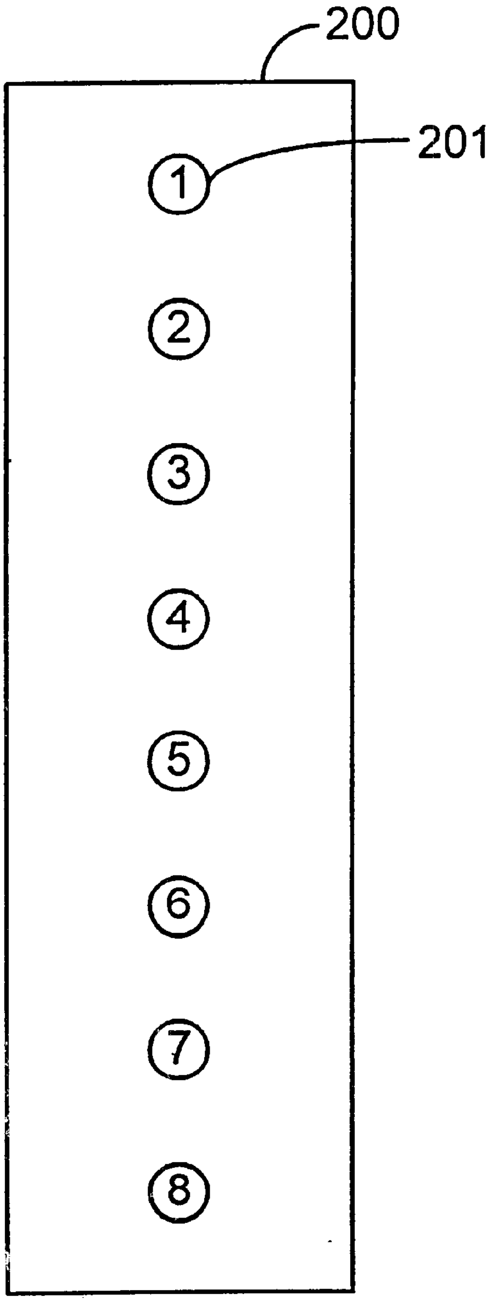
FIG. 4 shows a plan view of a substrate with different addressable locations.

The addressable locations on the sample substrate may be arranged in any suitable manner. For example, the addressable locations on the substrate can be in a one-dimensional or a two-dimensional array on the substrate. Each addressable location is typically a discrete location that is spatially separated from the other addressable locations on the substrate. For example, FIG. 4 shows an exemplary substrate 200 with various addressable locations 201 labeled 1 through 8. Any of these addressable locations may be identified as the reference addressable location. The eight addressable locations are spatially separated from each other and form a one-dimensional array of addressable locations. In other embodiments, 20 or more, or even 100 or more addressable locations per substrate can be present.

Any suitable process can be used to deposit the calibration substances on the substrate. For example, pipettes can be used to deposit the calibration substances on the substrate. Typically, the calibration substances are contained in liquid samples that may have volumes on the order of microliters or nanoliters. In some embodiments of the invention, adsorbents may be present at different addressable locations on a sample substrate. A liquid containing one or more calibration substances can then be washed over the surface of the adsorbents. The calibration substances are retained on the regions of the substrate with the adsorbents, but are not retained on the regions of the sample substrate without the adsorbent.

Each addressable location on the substrate can also include an energy-absorbing molecule (EAM). These are molecules that absorb energy from an energy source in a mass spectrometer thereby enabling desorption of an analyte from the substrate surface. Energy absorbing molecules used in a MALDI (matrix assisted laser desorption ionization) process are frequently referred to as a "matrix". Examples of energy absorbing molecules include cinnamic acid derivatives and sinapinic acid (SPA). EAMs can be formed at the different addressable locations on the substrate to form discrete EAM regions. Calibration substances can be subsequently deposited on these EAM regions or may be premixed with EAM containing solutions prior to deposition upon their ultimate addressable location.

Figure 5:
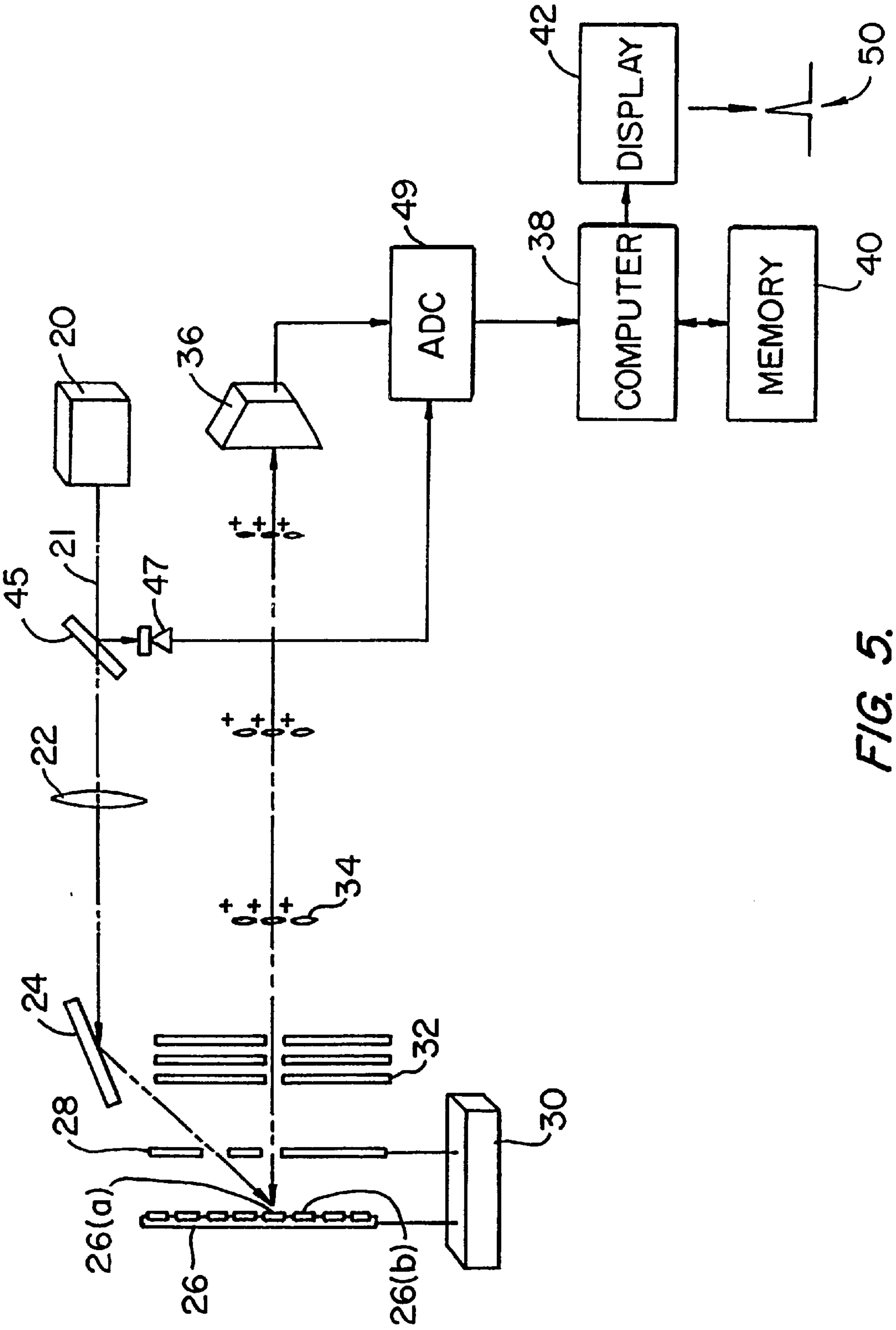
FIG. 5 shows another schematic diagram for a time-of-flight mass spectrometer.

After preparing the sample substrate containing the calibration substances, the mass spectrometer ionizes and desorbs the one or more calibration substances at each of the different addressable locations on the sample substrate (step 54). Referring to FIG. 5, for example, a laser 20 emits a laser beam 21 that passes to a beam splitter 45, which splits the laser beam 21. A portion of the laser beam passes to an event-triggering device such as a trigger photodiode 47, which serves as a lasing event detector. A lens 22 focuses another portion of the laser beam 21. A mirror 24 reflects the focused laser beam and directs the focused laser beam to the sample substrate 26. The focused laser beam irradiates calibration substances at a first addressable location 26(*a*) on the sample substrate 26. As a result, the irradiated calibration substances are ionized to form calibration substance ions 34. The ions 34 subsequently desorb off of the sample substrate 26.

Although a laser desorption process is described with reference to FIG. 5, any suitable ionization technique can be used to desorb and ionize the calibration substances. The ionization techniques may use, for example, electron ionization, fast atom/ion bombardment, matrix-assisted laser desorption/ionization (MALDI), surface enhanced laser desorption/ionization (SELDI), or electrospray ionization. These ionization techniques are well known in the art.

In preferred embodiments, a laser desorption time-of-flight mass spectrometer is used. Laser desorption spectrometry is especially suitable for analyzing high molecular weight substances such as proteins. For example, the practical mass range for a MALDI or a SELDI process can be up to 300,000 daltons or more. Moreover, laser desorption processes can be used to analyze complex mixtures and have high sensitivity. In addition, the likelihood of protein fragmentation is lower in a laser desorption process such as a MALDI or a surface enhanced laser desorption/ionization process than in many other mass spectrometry processes. Thus, laser desorption processes can be used to accurately characterize and quantify high molecular weight substances such as proteins.

Surface-enhanced laser desorption/ionization, or SELDI, represents a significant advance over MALDI in terms of specificity, selectivity and sensitivity. SELDI is described in U.S. Pat. No. 5,719,060 (Hutchens and Yip). SELDI is a solid phase method for desorption in which the analyte is presented to the laser while on a surface that enhances analyte capture and/or desorption.

After ionization and desorption, the mass spectrometer forms a mass spectrum signal and determines the time-of-flight values for each of the calibration substances at each of the different addressable locations on the substrate (step 56). Referring to FIG. 5, after being desorbed, the calibration substance ions 34 separate from the sample substrate 26 and "fly" through the analyzer region between the ion lenses 32 and the detector 36.

For the purpose of illustration, all subsequent data handling will be discussed in terms of an ADC system. It is understood by those skilled in the art that a time-to-digital (TDC) system using a digital converter such as a time-to-digital recorder would operate somewhat differently while achieving the same end results. The ADC could alternatively be a digital oscilloscope, a waveform recorder, or a pulse counter.

However, in the example shown in FIG. 5, the detector 36 subsequently detects the ions 34, and sends a signal to a high-speed analog-to-digital converter (ADC). The ion flight time measurement is performed by the ADC 49. After receiving a start trigger from the trigger photodiode 47, the ADC 49 integrates detector output voltage at regular time intervals.

Arrival of the ADC start signal from the trigger photodiode 47 can be coordinated with the onset of ion extraction. However, the operational scheme here is dependent upon the mode of ion extraction. For continuous ion extraction (CIE), the lasing event is coincident with ion extraction and hence the photodiode trigger is used to start the ADC timing cascade. For pulsed ion extraction (PIE), the lasing event that generates the ions is uncoupled from the actual ion extraction event. When the arrival of the ADC start signal from the trigger photodiode is coordinated with the onset of ion extraction, the photodiode trigger functions to start a delay generator which when timed out then triggers the ion extraction event. The ion extraction trigger is used to start the timing cascade of the ADC.

After receiving the start signal, the ADC 49 sorts the integrated detector voltage values and produces a digital output for a digital computer 38, which is operatively coupled to the ADC 49, a display 42, and a memory 40. The digital computer 38 can provide visualization and higher order processing for the ion signal using the digital output from the ADC 49. The determined time-of-flight values and the digital signal that was used to determine the time-of-flight values may be stored in the memory 40. The memory 40 may comprise any suitable memory device including, for example, a memory chip or an information storage medium such as a disk drive. The memory 40 could be on the same or different apparatuses.

After the mass spectrometer determines a time-of-flight value for the calibration substance ions desorbed from the first addressable location 26(*a*), the sample substrate 26 moves so that the time-of-flight values for calibration substance ions desorbed from a second addressable location 26(*b*) can be determined. This process is repeated until time-of-flight values for the ionized calibration substances are collected for each addressable location on the sample substrate 26.

After time-of-flight values are obtained for each addressable location on the substrate, the digital computer 38 calculates the correction factors for the addressable locations (step 58). The digital computer 38 can include a computer readable medium with appropriate computer code for calculating correction factors for the different addressable locations on the sample substrate.

The correction factors may be calculated in any suitable manner. In some embodiments, each correction factor is determined by calculating $Tof_X/Tof_R$ (i.e., dividing $Tof_X$ by $Tof_R$) for each addressable location on the substrate. $Tof_X$ is the time-of-flight for the calibration substance, where X is a variable. X corresponds to the addressable location on the substrate. For example, if a substrate has 26 different addressable locations labeled a to z, X can be any of a to z. $Tof_R$ is the time-of-flight value for the ionized calibration substance at a reference addressable location R on the substrate. Any suitable addressable location on the substrate may be designated as the reference addressable location R.

In some embodiments of the invention, multiple sample substrates with calibration substances can be used to form accurate correction factors. Each addressable location on each sample substrate can have one or more calibration substances. Time-of-flight values for calibration substances on different, but corresponding, addressable locations on different sample substrates are determined. The time-of-flight values associated with the calibration substances corresponding addressable locations on the different sample substrates may be averaged (or manipulated by other statistical processes) to remove the effects of random error. For example, two substrates, substrate 1 and substrate 2, can be used to calibrate a mass spectrometer. Each substrate can have the similar dimensions and can have calibration substances at similar addressable locations. For example, substrate 1 and substrate 2 can both have addressable locations A, B, and C at the same general locations on the substrates. Peptide 1 and peptide 2 can each be at addressable locations A, B, and C, on substrate 1 and substrate 2. The time-of-flight values for ions of peptide 1 at addressable location A on substrates 1 and 2 can be determined, and these time-of-flight values can be averaged to create an average time-of-flight value for peptide 1 at addressable location A. Average time-of-flight values can also be determined for ions of peptide 2 at addressable location A on substrates 1 and 2, ions of peptide 1 at addressable location B on substrates 1 and 2, etc. The average time-of-flight value for each calibration substance ion at each addressable location may be used to create accurate correction factors for each addressable location. For example, if addressable location A is the reference addressable location, a correction factor for addressable location B and for peptide 1 can be created by dividing the average time-of-flight value for ions of peptide 1 at addressable location B by the average time-of-flight for the ions of peptide 1 at addressable location A (i.e., Tof (average for peptide 1)$_B$/Tof(average for peptide 2)$_A$).

In other embodiments, multiple different calibration substances can be present at each addressable location on a sample substrate. Because corrections to errors caused by changes in the accelerating field strength E are independent of mass, multiple correction factors for each addressable location on a single sample substrate can be calculated substantially simultaneously using different calibration substances at each addressable location. At each addressable location, the correction factors are averaged. As noted above, averaging removes the effects of random error.

Also, one may check the variation in spread of the correction factor values to determine if the average correction factor is suitable. When averaging a number of correction factors together, the overall spread of the results provides a priori indication of the variance and inherent error in the measurement process. Accordingly, a minimally accepted value of error and variance can be established to judge the validity of the empirical process for establishing the value and quality of the correction factor. The absolute magnitude of this quality parameter is dependent upon the complexity and geometry of the time-of-flight analyzer. The quality metric in this case can be the calculated fractional standard deviation relative to the average correction factor for a series of empirical trials. For a simple, linear time-of-flight analyzer, the fractional standard deviation with respect to the average typically does not exceed 500 ppm (parts per million). For a sophisticated reflectron time-of-flight analyzer, such as a parallel extraction reflectron device or orthogonal extraction reflectron device, the fractional standard deviation with respect to the average typically does not exceed 5 ppm. In embodiments of the invention, if the standard deviation of the average correction factor is greater than a predetermined tolerance level, then the average correction factor may not be acceptable and the correction factor determination process may be repeated. If the standard deviation for the average correction factor is within a predetermined tolerance level (e.g., 5 ppm or 500 ppm depending on the particular system employed), then the average correction factor may be identified as a suitable correction factor for that addressable location. This process may be automated if desired. For example, the mass spectrometer can automatically start the mass spectrometry process and the correction factor calculation process over again if the standard deviation for the average correction factor is not within the predetermined tolerance level.

Illustratively, an average correction factor can be calculated for a particular addressable location using time-of-flight values for ions of different peptides at the addressable location. The peptides can have, for example, molecular weights of 100 Daltons, 500 Daltons, and 1000 Daltons. Using these three peptides, three correction factors can be calculated for the addressable location. The calculated correction factors based on these peptides can be averaged to form an average correction factor for that addressable location. If the standard deviation for the averaged correction factor is within a predetermined tolerance level of, for example, 5 ppm, then the averaged correction factor may be suitable for that addressable location. If it does not satisfy this tolerance level, the calibration substances at that addressable location can be reprocessed with the same or different calibration substances until an acceptable correction factor is obtained.

Using multiple different calibration substances at each addressable location has other advantages. For example, sometimes, there may be inherent sources of error in signals associated with the calibration substances. Ideally, each calibration substance is identified by a "peak" in a mass spectrum signal and the time-of-flight value or m/z value for that calibration substance is at the apex or the determined first moment of the peak. However, in some instances, a perfect apex or acceptable peak symmetry may not be formed. For example, the peak may sometimes "split" in the vicinity of the apex due to spurious noise. This makes it difficult to determine where the theoretical apex or the appropriate first moment of the peak lies, and thus the m/z value for the calibration substance associated with the peak. If only one calibration substance is present at each addressable location on a sample substrate, and one or more peaks in the mass spectra for the calibration substance are split, the resulting set of correction factors determined using the calibration substance may be somewhat inaccurate. However, in embodiments of the invention, correction factors for each addressable location can be created simultaneously using many calibration substances at each addressable location. Accordingly, the likelihood of not obtaining at least one acceptable set peaks for at least one calibration substance is low, so that at least one set of accurate correction factors can likely be determined.

Figure 6A:
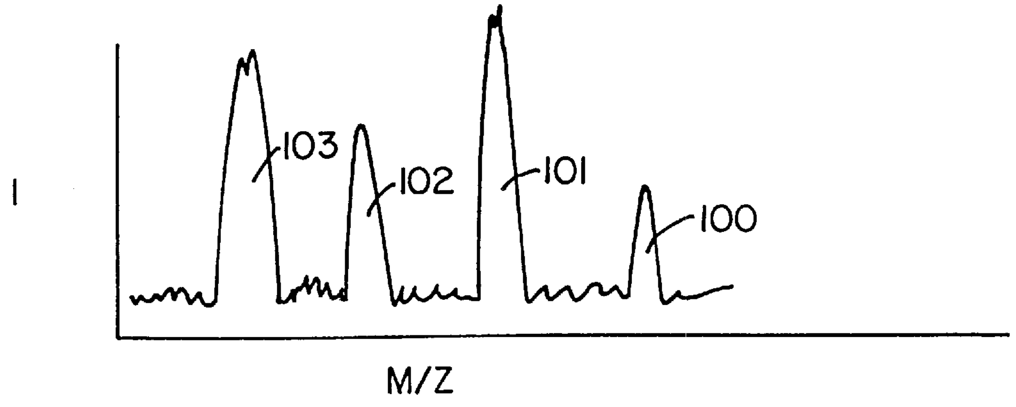
FIGS. 6(*a*) to 6(*c*) respectively show mass spectra for ionized calibration substances on different addressable locations on a sample substrate.
Figure 6B:
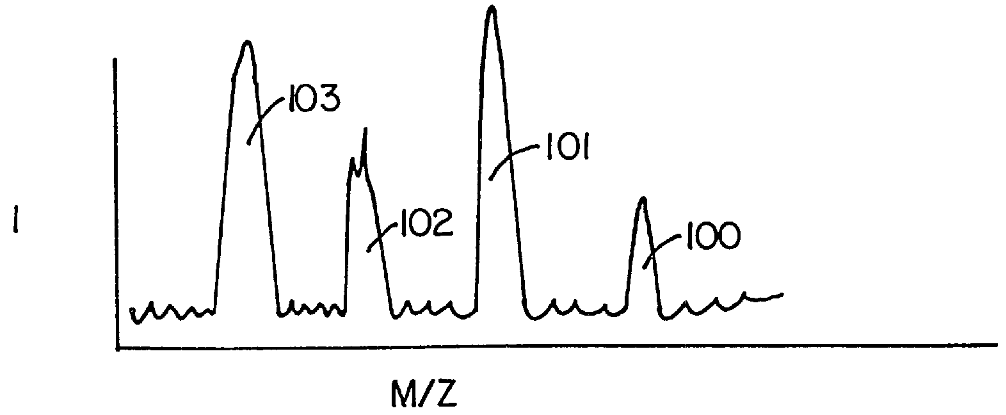
Figure 6C:
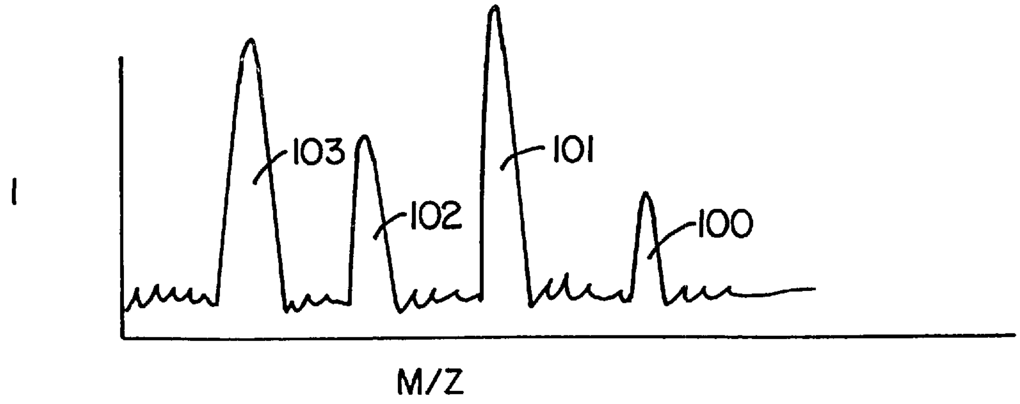
Figure 7:
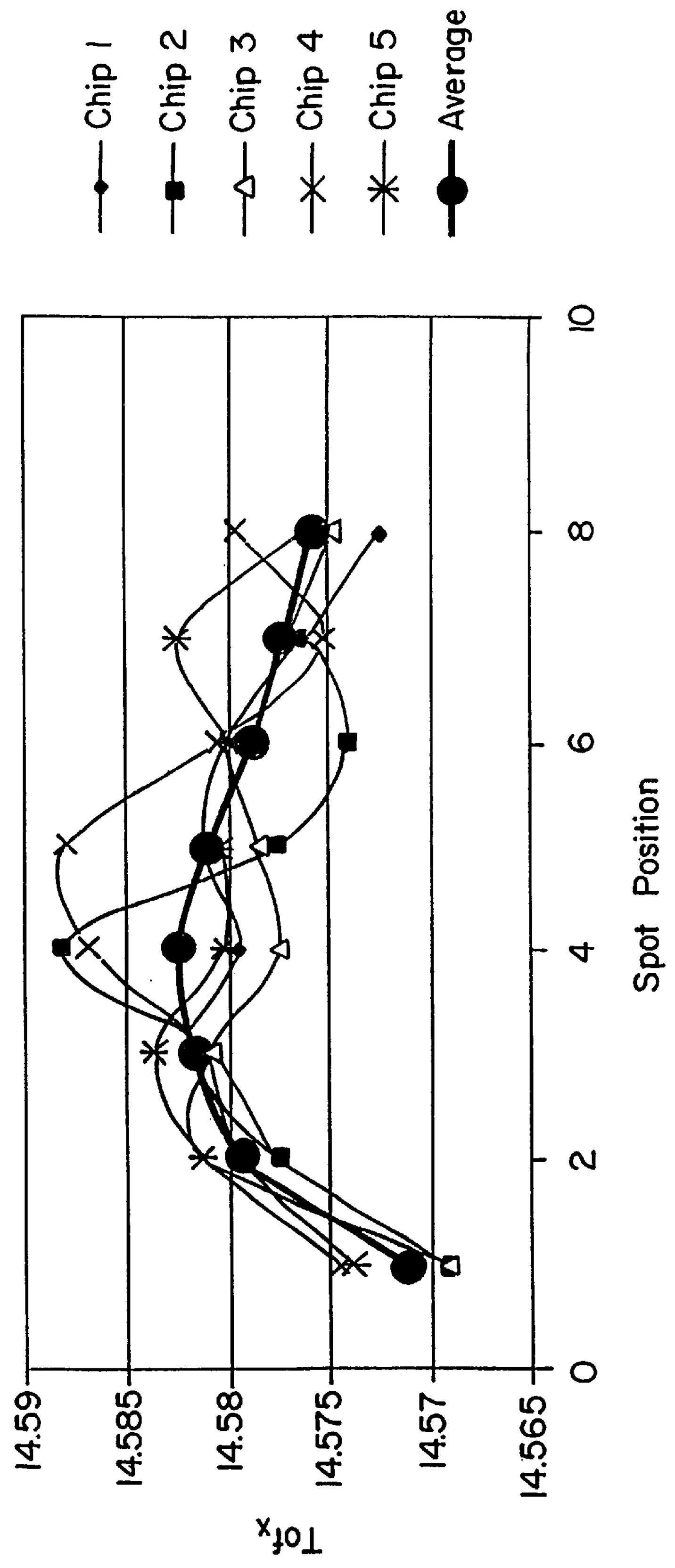
FIG. 7 shows a plot of time-of-flight vs. spot for $Arg^8$-Vasopressin.
Figure 8:
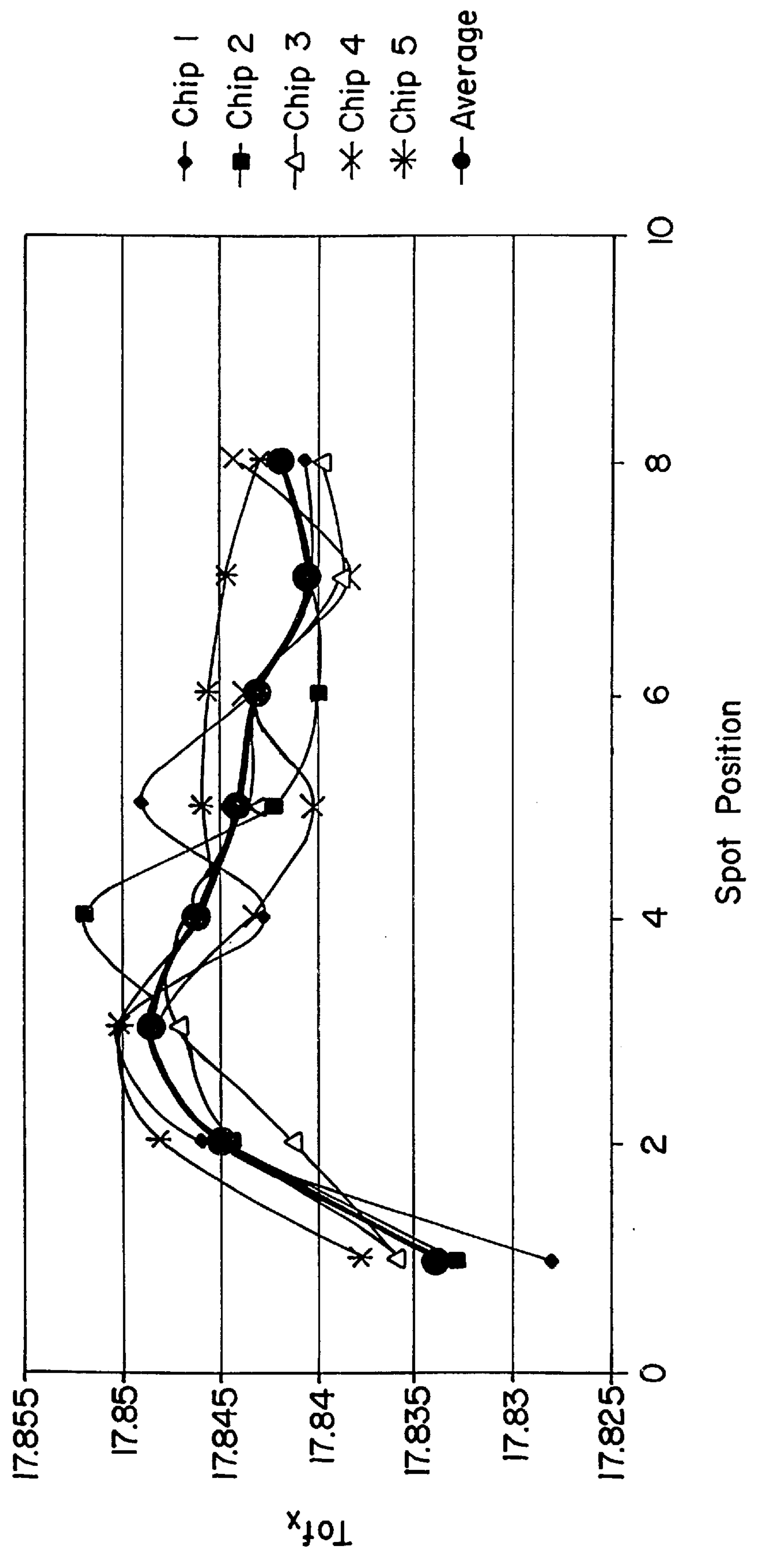
FIG. 8 shows a plot of time-of-flight vs. spot for Somatostatin.
Figure 9:
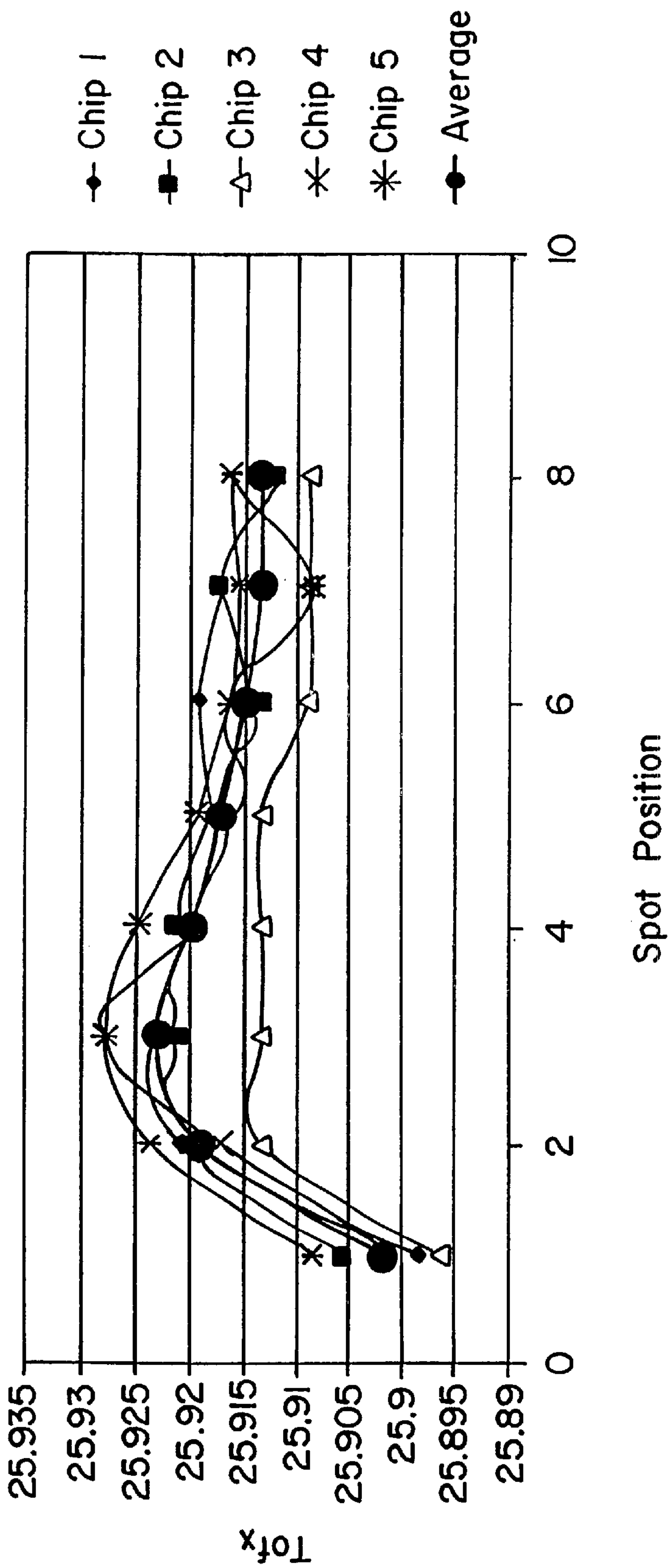
FIG. 9 shows a plot of time-of-flight vs. spot for bovine Insulin beta-chain.
Figure 10:
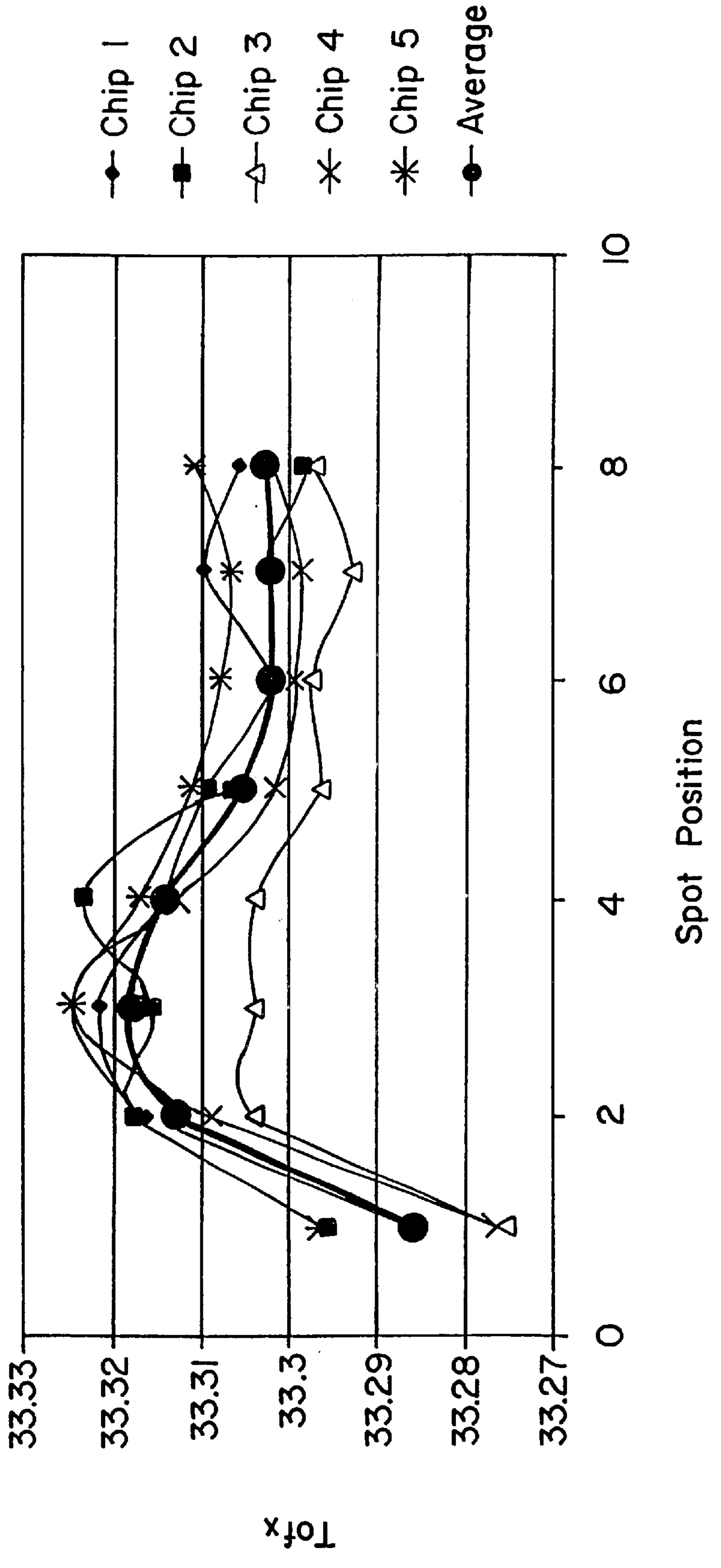
FIG. 10 shows a plot of time-of-flight vs. spot for Human Insulin.
Figure 11:
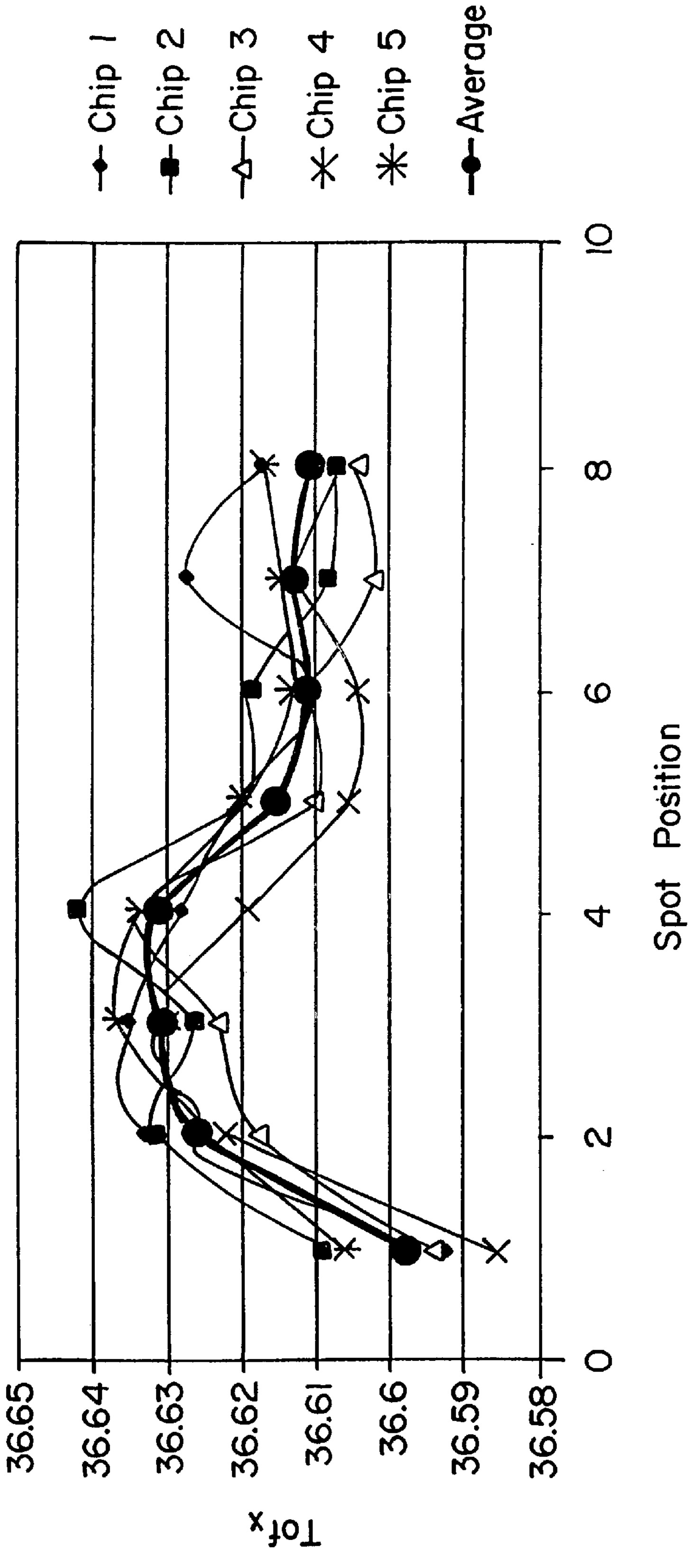
FIG. 11 shows a plot of time-of-flight vs. spot for Hirudin BHVK.
Figure 12:
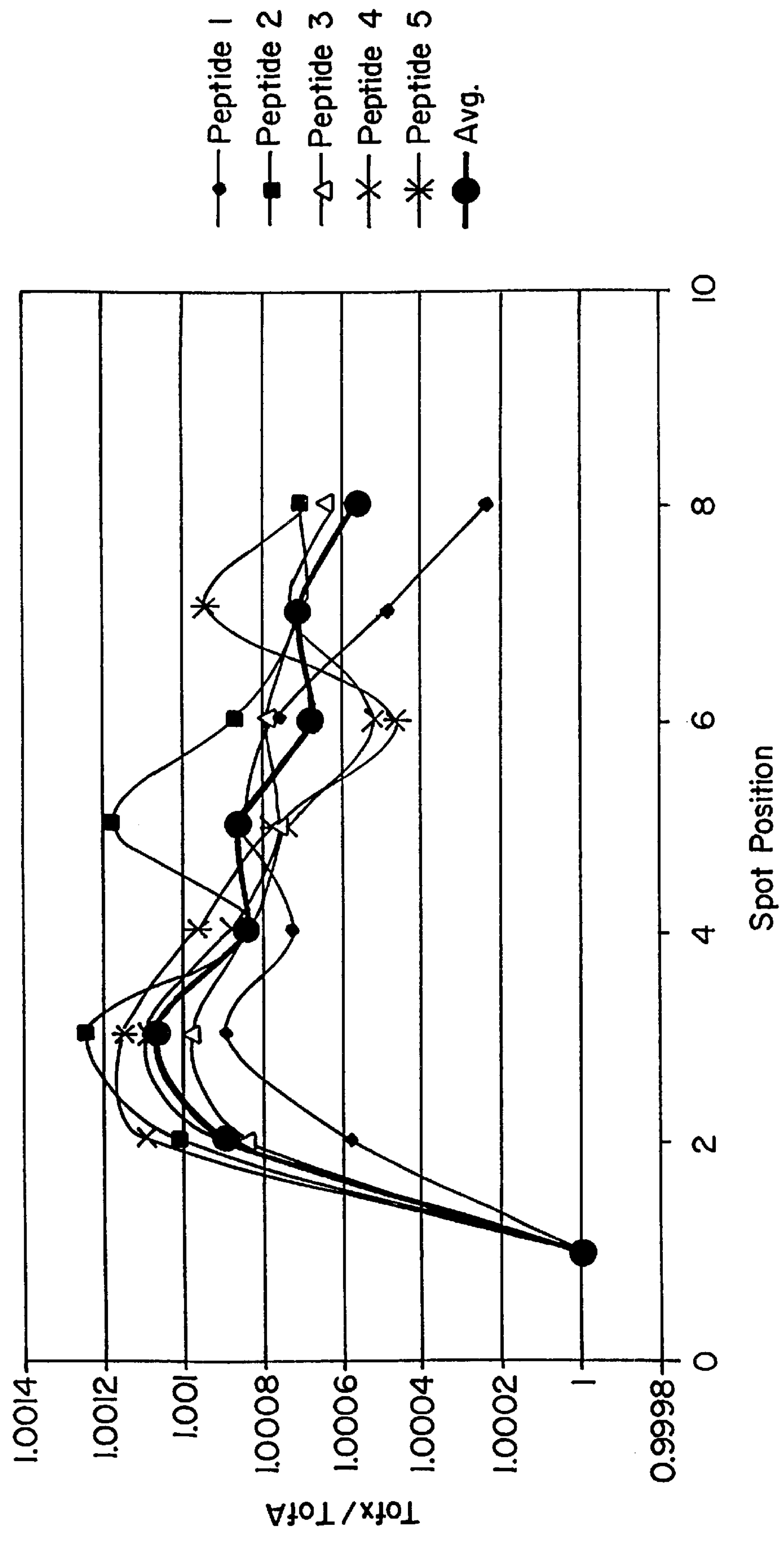
FIG. 12 shows a plot of $Tof_X/Tof_1$ vs. spot for Chip 1.
Figure 13:
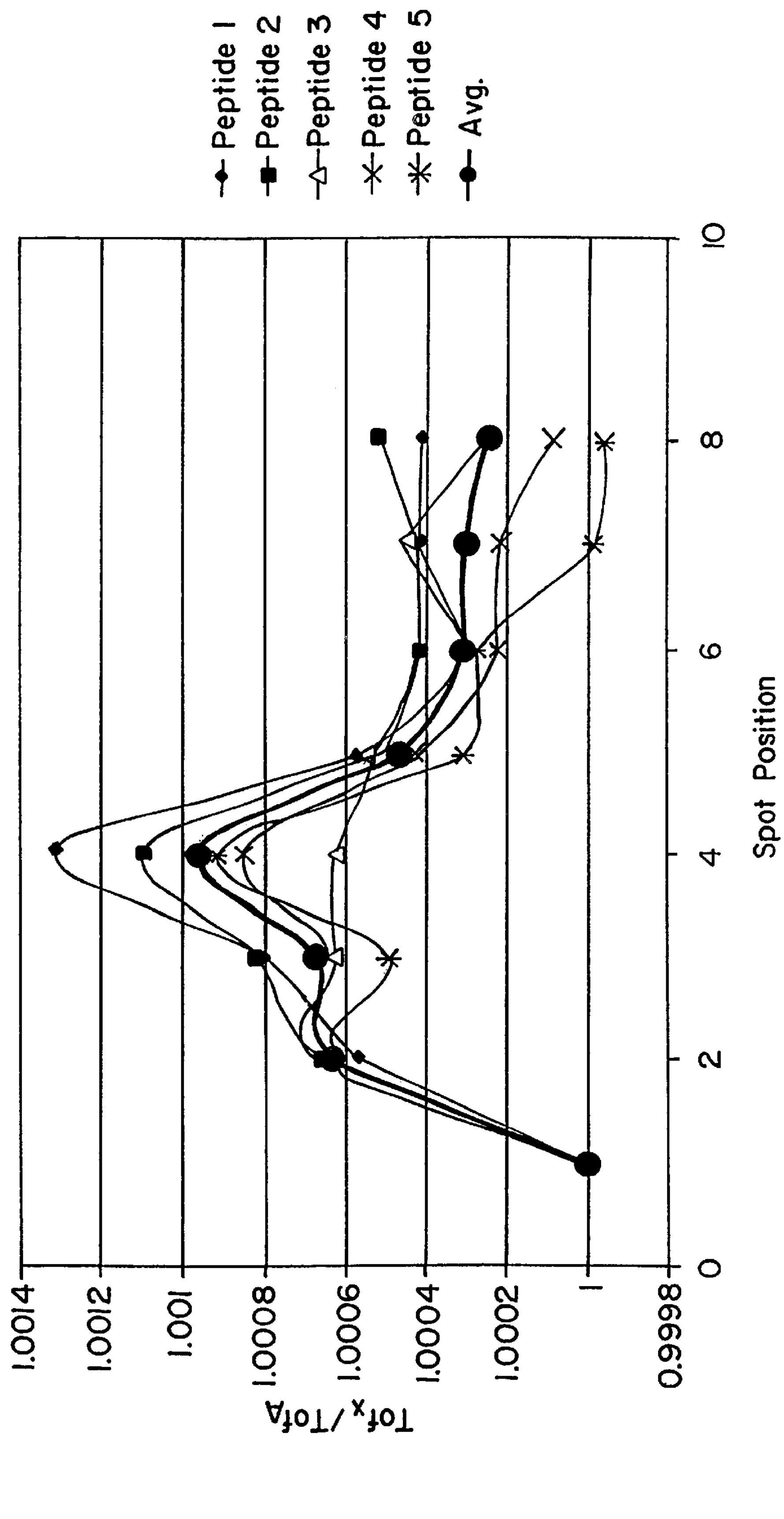
FIG. 13 shows a plot of $Tof_X/Tof_1$ vs. spot for Chip 2.
Figure 14:
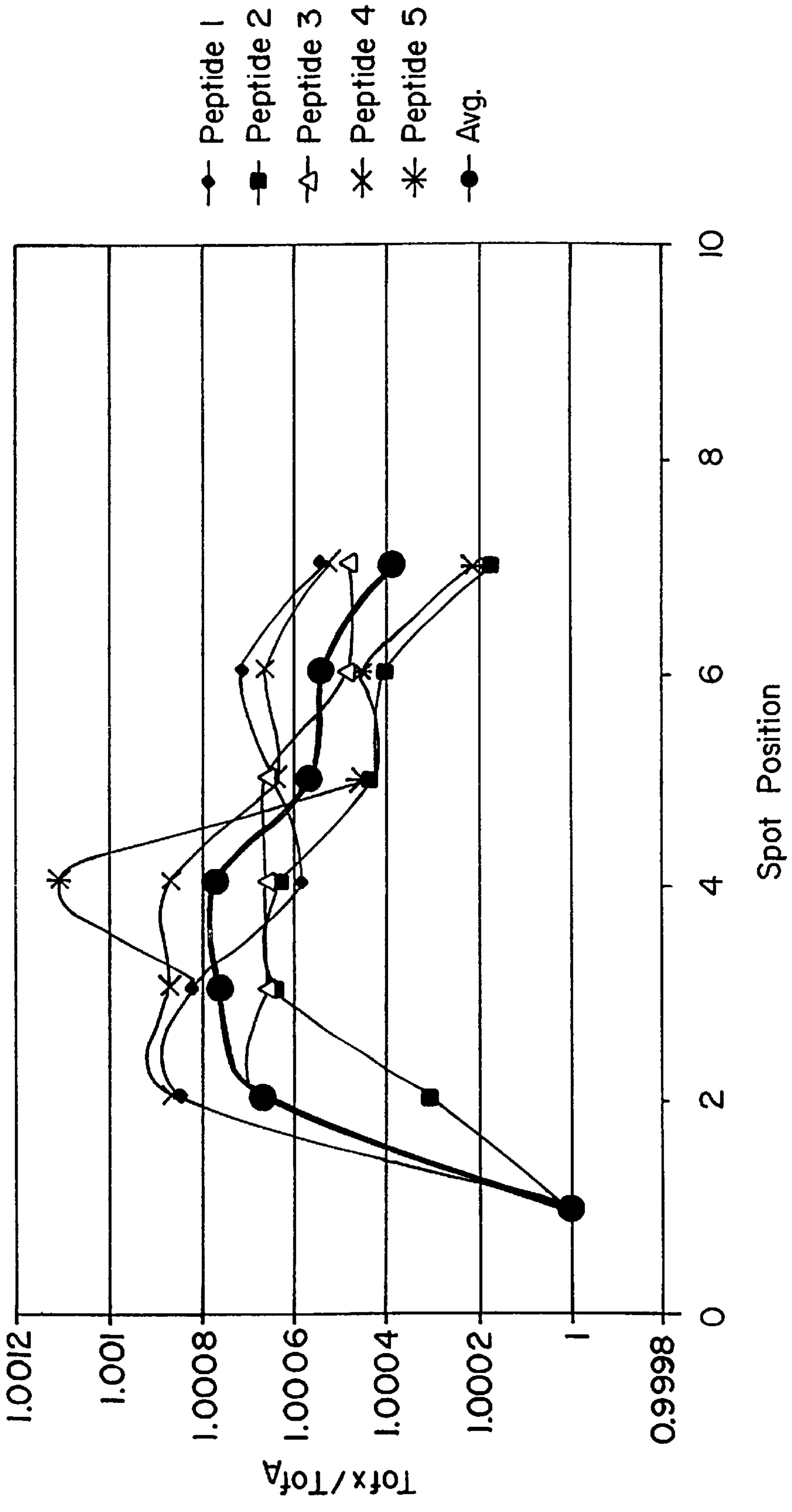
FIG. 14 shows a plot of $Tof_X/Tof_1$ vs. spot for Chip 3.
Figure 15:
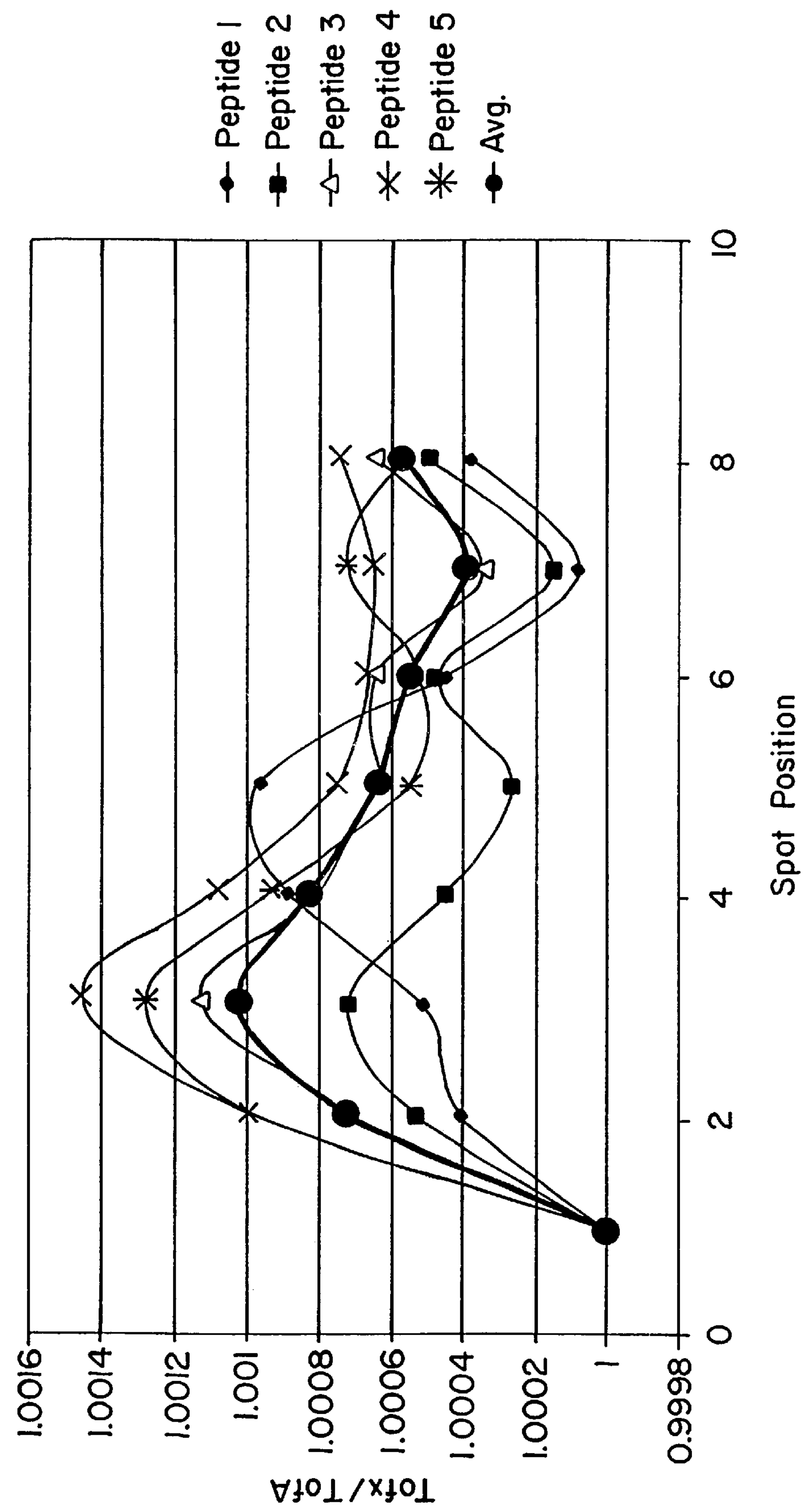
FIG. 15 shows a plot of $Tof_X/Tof_1$ vs. spot for Chip 4.
Figure 16:
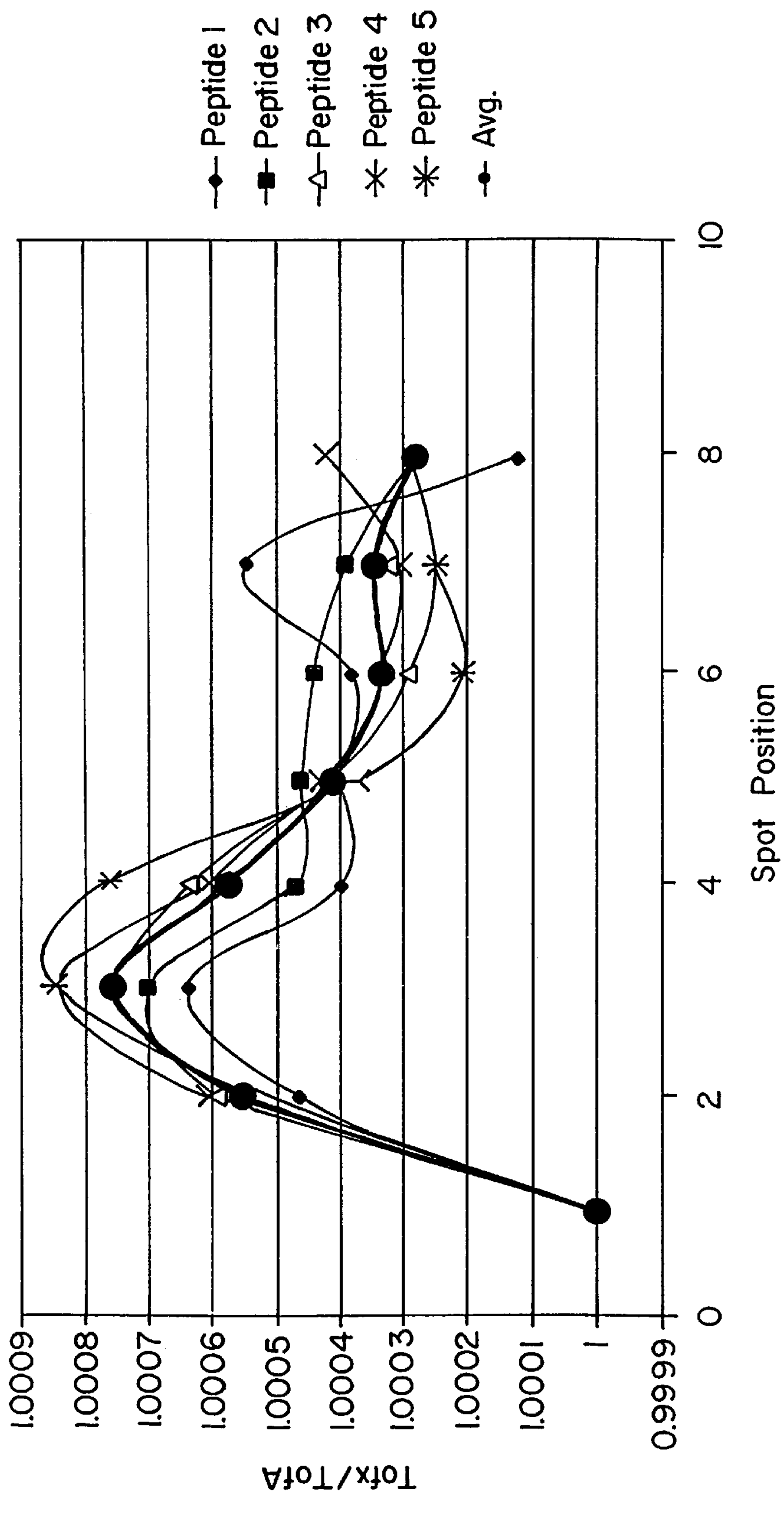
FIG. 16 shows a plot of $Tof_X/Tof_1$ vs. spot for Chip 5.

Illustratively, three mass spectra for four different calibration substances at each of three different addressable locations are respectively shown in FIGS. 6(*a*)–6(*c*). In each of these figures, "I" (on the y-axis) represents the intensity of a signal and "m/z" (on the x-axis) represents mass-to-charge ratio. In FIG. 6(*a*), peaks 101 and 103 have splits so that correction factors for this addressable location eventually calculated using the calibration substances associated with peaks 101 and 103 may not have the desired level of accuracy. In FIG. 6(*b*), peak 102 is split so that the correction factor calculated for this addressable location may not have the desired level of accuracy. In FIG. 6(*c*), all peaks are acceptable. In each of FIGS. 6(*a*), 6(*b*), and 6(*c*), each peak 100 is acceptable, and the calibration substance associated with the peak 100 can be used to create an accurate set of correction factors, even though other peaks in the various mass spectra may not be particularly acceptable to the user. By using many different calibration substances on each addressable location, at least one set of calibration substances will likely provide at least one set of acceptable time-of-flight values. Accordingly, at least one set of accurate correction factors will likely be determined when multiple calibration substances are used on each addressable location on the sample substrate. Thus, the calibration process can proceed quickly and efficiently in embodiments of the invention.

Once the correction factors are calculated, the digital computer 38 stores the correction factors in memory 40 (step 60). After the correction factors are stored in memory, they are applied to subsequent time-of-flight values for ions of analytes on other sample substrates (step 62). As noted above, any suitable mathematical operation may be performed when applying the correction factors to the time-of-flight values. For instance, the correction factor for each addressable location can be multiplied by the time-of-flight values obtained for the analytes at that addressable location.

Illustratively, there can be five different addressable locations on a substrate labeled addressable location 1, addressable location 2, addressable location 3, addressable location 4, and addressable location 5 (i.e., X=1, 2, 3, 4, and 5). The reference addressable location, R, can be addressable location 1. The uncorrected time-of-flight values for an ionized calibration substance at each of addressable locations 1 through 5 may be 100.100, 100.200, 100.300, 100.400, and 100.500, microseconds respectively. The correction factors ($Tof_X/Tof_1$) for these five addressable locations (X=1, 2, 3, 4, and 5) are 1.00000, 1.000999, 1.001998, 1.002997, and 1.003996, respectively. These five correction factors may be stored in memory in the mass spectrometer and then can be applied to subsequent time of flight values that are obtained for ions desorbed from other sample substrates. For example, a set of analyte ions from a different sample substrate may have uncorrected time-of-flight values of 150, 200, 250, 300, and 350 microseconds at addressable locations 1 through 5, respectively. Each of these uncorrected time-of-flight values may be multiplied by the correction factors stored in memory to produce corrected time-of-flight values for addressable locations 1 through 5. For instance, in this example, the corrected time-of-flight values for the analyte ions from addressable locations 1 to 5 may be 150, 200.1998, 250.4995, 300.8991, and 351.3986, microseconds respectively. The corrections to the time-of-flight values for the analyte ions are valid, even through the analyte ions have a different mass than the mass of the calibration substance used to create the correction factors.

Correction factors may be applied to the entire mass spectrum signal or only the time-of-flight values (or m/z values) obtained from the mass spectrum signal. For instance, one may multiply a correction factor for a particular addressable location on sample substrate and the entire mass spectrum signal for analytes at that addressable location. If this is done, the entire mass spectrum including peak intensities corresponding to analyte ions and any noise in the mass spectrum would be shifted by an amount proportional to the value of the correction factor for that addressable location.

In other embodiments, one may multiply a correction factor for a particular addressable location on a sample substrate and only the time-of-flight values (or values derived from the time-of-flight values) for the analyte ions together. The noise need not be multiplied by the correction factor. These embodiments can occupy less computational resources as only the time-of-flight or m/z values in the mass spectrum are adjusted by the correction factors.

In one exemplary process, peaks may first be identified in a mass spectrum signal. To the extent that the time-of-flight values can be assigned, time-of-flight values can be assigned to the peaks in the mass spectrum signal. If some peaks have splits in them or are broadened as to otherwise make it difficult to determine what true time-of-flight values are associated with the peaks, the time-of-flight values for those peaks may be approximated. Peaks can sometimes be broadened for a variety of reasons including sample heterogeneity creating poorly resolved populations of isotopic or isobaric species, inherent problems with the desorption process, instrumental problems with respect to timing jitter, instrumental problems with respect to acceleration voltage potentials, etc. Under such circumstances, the apex of the measured signal may not necessarily represent the true time-of-flight value or m/z value distribution of the detected ion signal. One way to approximate the time-of-flight value is to fit (e.g., overlay) a curve such as a Gaussian or Lorenzian curve to the broadened or split peak. The curve fit can then approximate a more accurate representation for the average time-of-flight value or m/z value for that given ion population and observed ion signal. Once the curve is fit to the peak, the time-of-flight value in these instances may be determined using the first moment or centroid of the curve to identify a time-of-flight value associated with the peak.

After the time-of-flight values for all peaks in a mass spectrum are determined, the previously determined correction factors can be applied to the time-of-flight values without applying the correction factors to, for example, chemical noise. One way to do this is to create a corrected mass spectrum signal where only the peaks corresponding to analyte ions are shifted by an amount proportional to the applied correction factors. Only the data values forming the peaks are multiplied by the correction factors. The noise need not be multiplied by the correction factors. Then, corrected time-of-flight values (or values derived from the time-of-flight values) can be obtained from the corrected mass spectrum signal. In this embodiment, the time-of-flight values (or values derived from the time-of-flight values) are corrected by first correcting the mass spectrum signal containing the time-of-flight information. Corrected time-of-flight values are obtained using the corrected mass spectrum signal. Another way to do this is to obtain uncorrected time-of-flight values (or values derived from time-of-flight values) from an uncorrected mass spectrum signal. As noted above, time-of-flight values for peaks in the mass spectrum signal that are incomplete, split, etc. may be approximated. After obtaining an uncorrected set of time-of-flight values, the correction factors can be applied to the uncorrected time-of-flight values to form corrected time-of-flight values.

Regardless of how the correction factors are applied to the time-of-flight values, or values derived from the time-of-flight values, the corrected m/z values for the analyte ions can eventually be determined. A display 42 coupled to the computer 38 can then display a mass spectrum 50 showing a signal with "peaks" at the corrected m/z values for the analyte ions.

In other embodiments, instead of using time-of-flight values to form correction factors, it is possible to use values that are derived from time of flight values to form correction factors. Values such as mass-to-charge ratio values are proportional to time-of-flight values, and may thus be used to form correction factors as well. For example, time-of-flight values for a calibration substance on a plurality of addressable locations on a sample substrate can be first obtained according to conventional processes without applying correction factors to them. After the uncorrected time-of-flight values are obtained, m/z values for the calibration substances can be determined according to conventional calculations. One of the addressable locations can be identified as the reference addressable location, and correction factors based on the m/z values associated with each of the addressable locations can be calculated. For example, a correction factor for a particular addressable location can be determined by dividing the m/z value for calibration substance ions from the addressable location by the m/z value for the calibration substance ions from the reference addressable location. Correction factors for other addressable locations on the sample substrate can be determined in a similar manner. These correction factors can then be applied to uncorrected m/z values for analytes on addressable locations on other sample substrates. For example, the correction factors and the uncorrected m/z values can be multiplied together to form corrected m/z values.

In some embodiments of the invention, it is possible to extrapolate and create a function (e.g., a polynomial function) from a first plurality of correction factors. This can be done to in order to estimate correction factors (i.e., a second plurality of correction factors) for other addressable locations on a substrate, even though correction factors were not explicitly calculated for those other addressable locations. Any suitable function may be created in any suitable manner. For example, FIG. 4 shows 8 addressable locations 201 on a substrate 200. These 8 addressable locations are numbered 1 through 8 from the top to the bottom. In exemplary extrapolation method, correction factors could be calculated for four of the eight addressable locations 201. For instance, correction factors could be calculated for the addressable locations labeled 1, 3, 5, and 7. Once the correct factors are determined, a mathematical function (e.g., a curve) may be developed that correlates the addressable locations 1, 3, 5, and 7 to their correction factors. For example, a mathematical function could be created that correlates the y-positions (e.g., 1 mm from the top, 2 mm from the top, etc.) of the addressable location 1, 3, 5, and 7 on the substrate 200 to their corresponding correction factors for addressable locations 1, 3, 5, and 7. In this example, a two-dimensional graph could be created with the y-axis of the graph corresponding to y-positions on the substrate 200 and the x-axis of the graph corresponding to the correction factors. From the determined mathematical function, one can estimate correction factors for addressable locations 2, 4, 6, and 8 without having actually having calculated correction factors for them. Thus, in embodiments of the invention, it is possible to estimate correction factors for many addressable locations on a substrate while actually determining correction factors for a few addressable locations on the substrate.

Steps such as the determination of the time-of-flight values, the calculation and storage of the correction factors, and the retrieval and subsequent application of the correction factors, the formation of a mathematical function to estimate other correction factors, and other steps, can be embodied by any suitable computer code that can be executed by any suitable computational apparatus. The computational apparatus may be incorporated into the mass spectrometer or may be separate from and operatively associated with the mass spectrometer. Any suitable computer readable media including magnetic, electronic, or optical disks or tapes, etc. can be used to store the computer code. The code may also be written in any suitable computer programming language including, for example, Fortran, Pascal, C, C++, etc. Accordingly, embodiments of the invention can be automatically performed without significant intervention on the part of the user. However, in other embodiments, at least some of the steps could alternatively be performed manually by the user. For example, the calculation of the correction factors may be calculated manually by a user and then entered into a computer by the user.

EXAMPLES

Experiments were conducted to verify the presence of positional dependent, systematic shifts in measured time-of-flight values obtained from a time-of-flight mass spectrometer. In the experiments, the time-of-flight values for ions of five peptides at different addressable locations on five different chips (i.e., the sample substrates) were determined. In these examples, the addressable locations are referred to as "spot positions". The chips were obtained from Ciphergen Biosystems, Inc. of Fremont, Calif., and analyzed on a Ciphergen PBS II™, laser desorption/ionization time-lag-focusing, time-of-flight mass spectrometer. Plots of the time-of-flight vs. spot position were made to demonstrate that the shifts in the obtained time-of-flight values were dependent on the addressable location of the peptides. When performed on several chips, it was possible to determine if the systematic shifts were reproducible. It was also possible to confirm that the systematic shifts were a major source of mass assignment error for this given mass spectrometer.

Other experiments were performed to verify that the systematic shifts were independent of the mass of the ions. The performed data analysis included determining correction factors for each peptide at each addressable location on each chip. The correction factors were plotted against the addressable locations of the peptides. The plots confirm the hypothesis that a single correction factor for an addressable location on a sample substrate can be used to correct errors, regardless of the mass of the ions.

The experimental procedure used is outlined as follows.

First, multiple peptide standards were deposited on each of eight spots on five chips. The eight spots on each chip were at identical locations. Each spot included an energy absorbing molecule, SPA (sinapinic acid). All data were collected under the same conditions, i.e., identical laser power, identical ion focusing time-lag conditions, ion acceleration energy, and the same mass spectrometer. For each chip, one spot on the chip served as the reference addressable location. The time-of-flight values associated with each peptide at each spot were recorded. The peptide standards were: $Arg^8$-Vasopressin (1084.2474 Da), Somatostatin (1637.9030 Da), Bovine Insulin β-chain (3495.9409 Da), Human Insulin (5807.6533 Da), and Hirudin BHVK (7033.6136 Da), each with average molecular weights as indicated.

Second, the time-of-flight values for the ions for all five peptides at each spot on each chip were obtained. The obtained time-of-flight values are in Tables I–V. In the following tables, "% RSD" stands for Relative Standard Deviation ((standard deviation/average)-100). All indicated times are in microseconds.

TABLE I

Peptide 1

| Spot Position | Chip 1 | Chip 2 | Chip 3 | Chip 4 | Chip 5 | Average | Standard Dev. | % RSD |
|---|---|---|---|---|---|---|---|---|
| A | 14.569 | 14.56944 | 14.56912 | 14.57384 | 14.57436 | 14.57115 | 0.002703 | 0.01855301 |
| B | 14.57748 | 14.57747 | 14.58118 | 14.57971 | 14.58115 | 14.5794 | 0.001854 | 0.012715313 |
| C | 14.58204 | 14.58091 | 14.58088 | 14.58127 | 14.58365 | 14.58175 | 0.001159 | 0.00794739 |
| D | 14.57957 | 14.58822 | 14.57753 | 14.58693 | 14.58021 | 14.58249 | 0.004768 | 0.032696072 |
| E | 14.58121 | 14.57742 | 14.57846 | 14.58794 | 14.58014 | 14.58103 | 0.00413 | 0.028325972 |
| F | 14.58008 | 14.57388 | 14.57933 | 14.58038 | 14.57994 | 14.57872 | 0.002734 | 0.01875632 |
| G | 14.57601 | 14.57526 | 14.57685 | 14.57509 | 14.58234 | 14.57711 | 0.003005 | 0.020612128 |
| H | 14.57234 | 14.57512 | 14.57458 | 14.57944 | 14.57614 | 14.57552 | 0.002592 | 0.017782874 |

TABLE II

Peptide 2

| Spot Position | Chip 1 | Chip 2 | Chip 3 | Chip 4 | Chip 5 | Average | Standard Dev. | % RSD |
|---|---|---|---|---|---|---|---|---|
| 1 | 17.828 | 17.83277 | 17.83595 | 17.83549 | 17.83774 | 17.83399 | 0.003792 | 0.021261046 |
| 2 | 17.84603 | 17.84433 | 17.84133 | 17.84487 | 17.84815 | 17.84494 | 0.002497 | 0.01399073 |
| 3 | 17.85014 | 17.84713 | 17.8473 | 17.84831 | 17.85024 | 17.84862 | 0.001501 | 0.008407965 |
| 4 | 17.84274 | 17.85195 | 17.84703 | 17.84356 | 17.8462 | 17.84629 | 0.003627 | 0.02032456 |
| 5 | 17.84897 | 17.84225 | 17.84356 | 17.84025 | 17.84597 | 17.8442 | 0.003383 | 0.018957269 |
| 6 | 17.84339 | 17.83995 | 17.84305 | 17.84383 | 17.84566 | 17.84317 | 0.002064 | 0.011567462 |
| 7 | 17.84037 | 17.84019 | 17.83897 | 17.83829 | 17.8447 | 17.8405 | 0.0025 | 0.014011026 |
| 8 | 17.84056 | 17.84164 | 17.83972 | 17.84431 | 17.84292 | 17.84183 | 0.001831 | 0.010264869 |

TABLE III

Peptide 3

| Spot Position | Chip 1 | Chip 2 | Chip 3 | Chip 4 | Chip 5 | Average | Standard Dev. | % RSD |
|---|---|---|---|---|---|---|---|---|
| 1 | 25.89849 | 25.90564 | 25.89643 | 25.89938 | 25.90854 | 25.9017 | 0.005143 | 0.019856602 |
| 2 | 25.92023 | 25.92146 | 25.91346 | 25.91718 | 25.92392 | 25.91925 | 0.004046 | 0.015609216 |
| 3 | 25.924 | 25.92146 | 25.91346 | 25.92861 | 25.92773 | 25.92305 | 0.006086 | 0.023476003 |
| 4 | 25.92014 | 25.92146 | 25.91346 | 25.92023 | 25.92497 | 25.92005 | 0.004173 | 0.016100596 |
| 5 | 25.91811 | 25.91819 | 25.91346 | 25.916 | 25.91938 | 25.91703 | 0.002337 | 0.009017529 |
| 6 | 25.91893 | 25.91319 | 25.9089 | 25.91601 | 25.91614 | 25.91463 | 0.003793 | 0.014638003 |
| 7 | 25.91662 | 25.91686 | 25.90883 | 25.9083 | 25.9151 | 25.91314 | 0.004237 | 0.01634951 |
| 8 | 25.91345 | 25.91172 | 25.90862 | 25.9164 | 25.91611 | 25.91326 | 0.00324 | 0.01250172 |

TABLE IV

Peptide 4

| Spot Position | Chip 1 | Chip 2 | Chip 3 | Chip 4 | Chip 5 | Average | Standard Dev. | % RSD |
|---|---|---|---|---|---|---|---|---|
| 1 | 33.28509 | 33.29532 | 33.27525 | 33.27655 | 33.29653 | 33.28575 | 0.010038 | 0.030158 |
| 2 | 33.31632 | 33.31791 | 33.30402 | 33.30937 | 33.31693 | 33.31291 | 0.006006 | 0.018029 |
| 3 | 33.32163 | 33.31567 | 33.30402 | 33.32503 | 33.32442 | 33.31816 | 0.008726 | 0.026189 |
| 4 | 33.31465 | 33.32338 | 33.30402 | 33.31271 | 33.317 | 33.31435 | 0.007036 | 0.021119 |
| 5 | 33.30936 | 33.30881 | 33.29644 | 33.30164 | 33.31107 | 33.30546 | 0.006204 | 0.018628 |
| 6 | 33.30221 | 33.30275 | 33.2972 | 33.299 | 33.30781 | 33.30179 | 0.004067 | 0.012214 |
| 7 | 33.30922 | 33.30222 | 33.29249 | 33.2984 | 33.30667 | 33.3018 | 0.006655 | 0.019983 |
| 8 | 33.30542 | 33.29783 | 33.29671 | 33.30138 | 33.31069 | 33.30241 | 0.005746 | 0.017253 |

TABLE V

Peptide 5

| Spot Position | Chip 1 | Chip 2 | Chip 3 | Chip 4 | Chip 5 | Average | Standard Dev. | % RSD |
|---|---|---|---|---|---|---|---|---|
| 1 | 36.59308 | 36.60932 | 36.5944 | 36.58568 | 36.60602 | 36.5977 | 0.00976 | 0.026667 |
| 2 | 36.63304 | 36.63181 | 36.61804 | 36.62222 | 36.62461 | 36.62595 | 0.006383 | 0.017427 |
| 3 | 36.63507 | 36.62696 | 36.62365 | 36.63254 | 36.63708 | 36.63106 | 0.005614 | 0.015327 |
| 4 | 36.6285 | 36.6424 | 36.63472 | 36.61968 | 36.63383 | 36.63183 | 0.008409 | 0.022955 |
| 5 | 36.62126 | 36.62037 | 36.61054 | 36.60593 | 36.61981 | 36.61558 | 0.006922 | 0.018904 |
| 6 | 36.60995 | 36.61883 | 36.61039 | 36.60466 | 36.61366 | 36.6115 | 0.005216 | 0.014248 |
| 7 | 36.62747 | 36.60857 | 36.60228 | 36.61227 | 36.61519 | 36.61316 | 0.009343 | 0.025519 |
| 8 | 36.61739 | 36.60749 | 36.60437 | 36.60686 | 36.61671 | 36.61056 | 0.006041 | 0.0165 |

The data were overlaid for each chip for a total of five plots for five peptides. Average time-of-flight values associated with each peptide on each spot on each of the five chips were obtained. Plots of the average time-of-flight value vs. spot addressable location were overlaid with the other plots. The overlaid plots are shown in FIGS. 7 to 11. Each of the curves shown in FIGS. 7 to 11 have the same general shape, even through the five peptides that were evaluated had very different mass values. In addition, each of FIGS. 7 to 11 shows that the time-of-flight values varied depending upon the particular addressable location of the calibration substance. In sum, FIGS. 7 to 11 show that the errors in the time-of-flight values are systematic, that the systematic errors are indeed reproducible and that the errors are a major source of external standard mass assignment error.

Third, after the time-of-flight values were obtained for each of the peptide ions, correction factors were calculated by dividing the time-of-flight value for each peptide ion at each addressable location, $ToF_X$, by the time-of-flight value for the peptide ion at the reference addressable location, $ToF_R$. In this example, the reference addressable location was spot 1. The calculated correction factors are listed in Tables VI to X.

TABLE VI

Chip 1

| Spectrum Tag | Peptide 1 | Peptide 2 | Peptide 3 | Peptide 4 | Peptide 5 | Avg. | Standard dev. | % RSD |
|---|---|---|---|---|---|---|---|---|
| spot1 | 1 | 1 | 1 | 1 | 1 | 1 | 0 | 0 |
| spot2 | 1.000582 | 1.001011 | 1.000839 | 1.000938 | 1.001092 | 1.000893 | 0.000176 | 0.017622 |
| spot3 | 1.000895 | 1.001242 | 1.000985 | 1.001098 | 1.001147 | 1.001073 | 0.000122 | 0.012178 |
| spot4 | 1.000725 | 1.000827 | 1.000836 | 1.000888 | 1.000968 | 1.000849 | 7.96E −05 | 0.007955 |
| spot5 | 1.000838 | 1.001177 | 1.000758 | 1.000729 | 1.00077 | 1.000854 | 0.000165 | 0.016487 |
| spot6 | 1.000761 | 1.000863 | 1.000789 | 1.000514 | 1.000461 | 1.000678 | 0.00016 | 0.015944 |
| spot7 | 1.000481 | 1.000694 | 1.0007 | 1.000725 | 1.00094 | 1.000708 | 0.000145 | 0.014537 |
| spot8 | 1.000229 | 1.000704 | 1.000578 | 1.000611 | 1.000664 | 1.000557 | 0.00017 | 0.016952 |

TABLE VII

Chip 2

| Spectrum Tag | Peptide 1 | Peptide 2 | Peptide 3 | Peptide 4 | Peptide 5 | Avg. | Standard dev. | % RSD |
|---|---|---|---|---|---|---|---|---|
| spot 1 | 1 | 1 | 1 | 1 | 1 | 1 | 0 | 0 |
| spot 2 | 1.00056 | 1.000656 | 1.000616 | 1.000683 | 1.000618 | 1.000626 | 4.17097E−05 | 0.004168 |

TABLE VII-continued

Chip 2

| Spectrum Tag | Peptide 1 | Peptide 2 | Peptide 3 | Peptide 4 | Peptide 5 | Avg. | Standard dev. | % RSD |
|---|---|---|---|---|---|---|---|---|
| spot 3 | 1.000799 | 1.000815 | 1.000616 | 1.000615 | 1.000485 | 1.000666 | 0.00012482 | 0.012474 |
| spot 4 | 1.001309 | 1.001088 | 1.000616 | 1.000848 | 1.000909 | 1.000954 | 0.000232952 | 0.023273 |
| spot 5 | 1.000556 | 1.000538 | 1.000488 | 1.000408 | 1.000304 | 1.000459 | 9.29628E −05 | 0.009292 |
| spot 6 | 1.000309 | 1.000408 | 1.000294 | 1.000225 | 1.000261 | 1.000299 | 6.13661E −05 | 0.006135 |
| spot 7 | 1.000405 | 1.000421 | 1.000437 | 1.000209 | 0.999979 | 1.00029 | 0.000176118 | 0.017607 |
| spot 8 | 1.000396 | 1.000503 | 1.000237 | 1.000076 | 0.99995 | 1.000232 | 0.000202144 | 0.02021 |

TABLE VIII

Chip 3

| Spectrum Tag | Peptide 1 | Peptide 2 | Peptide 3 | Peptide 4 | Peptide 5 | Avg. | Standard dev. | % RSD |
|---|---|---|---|---|---|---|---|---|
| spot 1 | 1 | 1 | 1 | 1 | 1 | 1 | 0 | 0 |
| spot 2 | 1.00084 | 1.000305 | 1.000663 | 1.00087 | 1.00065 | 1.000666 | 0.000201 | 0.020107 |
| spot 3 | 1.000819 | 1.000644 | 1.000663 | 1.00087 | 1.000804 | 1.00076 | 8.99E −05 | 0.008981 |
| spot 4 | 1.000586 | 1.000629 | 1.000663 | 1.00087 | 1.001108 | 1.000771 | 0.000195 | 0.019458 |
| spot 5 | 1.000651 | 1.000432 | 1.000663 | 1.000641 | 1.000444 | 1.000566 | 0.000105 | 0.010498 |
| spot 6 | 1.000711 | 1.000403 | 1.000486 | 1.000664 | 1.000439 | 1.000541 | 0.000124 | 0.012367 |
| spot 7 | 1.000539 | 1.000171 | 1.000483 | 1.000521 | 1.000217 | 1.000386 | 0.000159 | 0.015864 |
| spot 8 | 1.015207 | 1.01224 | 1.008786 | 1.007062 | 1.006167 | | | |

TABLE IX

Chip 4

| Spectrum Tag | Peptide 1 | Peptide 2 | Peptide 3 | Peptide 4 | Peptide 5 | Avg. | Standard dev. | % RSD |
|---|---|---|---|---|---|---|---|---|
| spot 1 | 1 | 1 | 1 | 1 | 1 | 1 | 0 | 0 |
| spot 2 | 1.000403 | 1.000526 | 1.000687 | 1.000987 | 1.000999 | 1.00072 | 0.00024 | 0.02398 |
| spot 3 | 1.00051 | 1.000719 | 1.001129 | 1.001457 | 1.001281 | 1.001019 | 0.000353 | 0.035228 |
| spot 4 | 1.000898 | 1.000453 | 1.000805 | 1.001087 | 1.000929 | 1.000834 | 0.000211 | 0.021117 |
| spot 5 | 1.000968 | 1.000267 | 1.000642 | 1.000754 | 1.000554 | 1.000637 | 0.000231 | 0.023091 |
| spot 6 | 1.000449 | 1.000468 | 1.000642 | 1.000675 | 1.000519 | 1.00055 | 9.17E −05 | 0.009165 |
| spot 7 | 1.000085 | 1.000157 | 1.000344 | 1.000657 | 1.000727 | 1.000394 | 0.000258 | 0.025831 |
| spot 8 | 1.000384 | 1.000495 | 1.000657 | 1.000746 | 1.000579 | 1.000572 | 0.000126 | 0.012571 |

TABLE X

Chip 5

| Spectrum Tag | Peptide 1 | Peptide 2 | Peptide 3 | Peptide 4 | Peptide 5 | Avg. | Standard dev. | % RSD |
|---|---|---|---|---|---|---|---|---|
| spot 1 | 1 | 1 | 1 | 1 | 1 | 1 | 0 | 0 |
| spot 2 | 1.000466 | 1.000584 | 1.000594 | 1.000613 | 1.000508 | 1.000553 | 5.62E −05 | 0.005614 |
| spot 3 | 1.000637 | 1.000701 | 1.00074 | 1.000838 | 1.000848 | 1.000753 | 8.07E −05 | 0.008061 |
| spot 4 | 1.000402 | 1.000474 | 1.000634 | 1.000615 | 1.00076 | 1.000577 | 0.000126 | 0.012604 |
| spot 5 | 1.000397 | 1.000461 | 1.000419 | 1.000437 | 1.000377 | 1.000418 | 2.95E −05 | 0.002953 |
| spot 6 | 1.000383 | 1.000444 | 1.000293 | 1.000339 | 1.000209 | 1.000334 | 7.98E −05 | 0.007977 |
| spot 7 | 1.000547 | 1.00039 | 1.000253 | 1.000305 | 1.00025 | 1.000349 | 0.000111 | 0.011126 |
| spot 8 | 1.000122 | 1.00029 | 1.000292 | 1.000425 | 1.000292 | 1.000284 | 9.62E −05 | 0.009613 |

Plots of correction factors ($Tof_X/Tof_R$) versus addressable location were created for all five chips. Data associated with each peptide were overlaid so that a total of 5 plots for 5 chips were created. By overlaying the plots, the presumption that corrections to the time-of-flight value errors are independent of the mass of the ions and that a single correction factor may be employed to correct such errors was confirmed.

The overlaid plots are shown in FIGS. 12 to 16. As evidenced by FIGS. 12 to 16, a single set of correction factors can be used to correct errors associated with different addressable locations on a sample substrate. For example, when viewing the graphs in FIGS. 12 to 16, each of the correction factors ($Tof_X/Tof_R$) generally fall between 1 and 1.0012. This is the case even though many different peptides with very different masses were used to create the correction factors. Thus, the data associated with FIGS. 12 to 16 show that corrections to mass errors are independent of the ion mass and that a single set of correction factors can correct mass errors across several substrates.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention.

All publications and patent documents cited in this application are incorporated by reference in their entirety for all purposes to the same extent as if each individual publication or patent document were so individually denoted. By their citation of various references in this document Applicants do not admit that any particular reference is "prior art" to their invention.

What is claimed is:

1. A method for calibrating a time-of-flight mass spectrometer, the method comprising:

a) determining time-of-flight values, or values derived from the time-of-flight values for a calibration substance at each of a plurality of different addressable locations on a sample substrate;

b) identifying one of the addressable locations on the substrate as a reference addressable location; and c) calculating a plurality correction factors for the respective addressable locations on the substrate using the time-of-flight value, or a value derived from the time-of-flight value, for the calibration substance on the reference addressable location, wherein each correction factor corrects the time-of-flight value, or the value derived from the time-of-flight value, for the calibration substance on an addressable location within the plurality of addressable locations with respect to the reference addressable location.

2. The method of claim 1 further comprising:

d) storing the calculated correction factors in memory.

3. The method of claim 1 wherein the sample substrate is a first sample substrate, and wherein the plurality of different addressable locations is a first plurality of addressable locations, and wherein the method further comprises:

d) applying the correction factors to subsequent time-of-flight values, or values derived from the subsequent time-of-flight values, for analytes on a second plurality of addressable locations on a second sample substrate, wherein the first plurality of addressable locations and the second plurality of addressable locations are at corresponding positions on the first sample substrate and the second sample substrate, respectively.

4. The method of claim 1 further comprising, prior to a):

d) depositing the calibration substance on each of the plurality of different addressable locations on the substrate;

e) inserting the substrate into a mass spectrometer; and f) desorbing and ionizing the calibration substance at each of the different addressable locations.

5. The method of claim 1 wherein each of the different addressable locations comprises a plurality of different calibration substances.

6. The method of claim 1 wherein the calibration substance is a polypeptide.

7. The method of claim 1 wherein b) occurs before a).

8. The method of claim 1 wherein c) calculating correction factors comprises:

d) determining, for each correction factor, $Tof_X/Tof_R$ for each addressable location on the substrate, wherein $Tof_X$ is the time-of-flight value for the calibration substance at an addressable location X on the substrate, wherein X is a variable, and wherein $Tof_R$ is the time-of-flight value for the calibration substance at the reference addressable location R on the substrate.

9. The method of claim 8 wherein the method further comprises:

d) storing the correction factors in memory.

10. The method of claim 9 further comprising:

e) retrieving the stored correction factors from memory; and f) applying the correction factors to time-of-flight values, or values derived from the time-of-flight values, for analyte substances on other substrates.

11. A mass spectrometer comprising:

a) an ionization source that generates ionized particles;

b) an ion detector with a detecting surface that detects the ionized particles and generates a signal in response to the detection of ionized particles;

c) a digital converter device adapted to convert the signal from the ion detector into a digital signal;

d) a triggering device operatively coupled to the digital converter, wherein the triggering device starts a time-period for measuring a time associated with the flight of the ionized particles to the ion detector;

e) a digital computer coupled to the digital converter, wherein the digital computer is adapted to process the digital signal from the digital converter; and f) a memory coupled to the digital computer, the memory storing the correction factors calculated according to the method in claim 1.

12. A method of using correction factors in a time-of-flight mass spectrometry process, the method comprising:

a) determining time-of-flight values, or values derived from the time-of-flight values, for analyte substances at each of addressable locations on a second sample substrate;

b) retrieving correction factors from memory, wherein the correction factors are formed by i) determining time-of-flight values for a calibration substance at each of a first plurality of addressable locations on a first sample substrate, ii) identifying one of the first plurality of addressable locations on the first sample substrate as a reference addressable location, and iii) calculating a plurality correction factors for the respective addressable locations on the first sample substrate using the time-of-flight value, or a value derived from the time-of-flight value, for the calibration substance on the reference addressable location, wherein each correction factor corrects the time-of-flight value, or the value derived from the time-of-flight value, for the calibration substance on an addressable location within the first plurality of addressable locations with respect to the reference addressable location; and c) applying the correction factors to the time-of-flight values, or the values derived from the time-of-flight values, for the analyte substances at the second plurality of addressable locations on the second sample substrate.

13. The method of claim 12 wherein c) applying the correction factors comprises:

multiplying the time-of-flight values, or the values derived from the time-of-flight values, for the analyte substances by the correction factors to obtain corrected time-of-flight values for the analyte substances on the second sample substrate.

14. The method of claim 12 wherein the method further comprises performing the steps i), ii), and iii), before a).

15. The method of claim 12 wherein determining time-of-flight values for the calibration substance at each of a plurality of different addressable locations on the sample substrate comprises:

determining time-of-flight values for a plurality of different calibration substances at each of the first plurality of addressable locations on the first sample substrate.

16. A computer readable medium comprising:

a) code for determining time-of-flight values for a calibration substance at each of a plurality of different addressable locations on a sample substrate;

b) code for identifying one of the addressable locations on the sample substrate as a reference addressable location; and c) code for calculating a plurality correction factors for the respective addressable locations on the substrate using the time-of-flight value, or a value derived from the time-of-flight value, for the calibration substance on the reference addressable location, wherein each correction factor corrects the time-of-flight value, or the value derived from the time-of-flight values, for the calibration substance on an addressable location within the plurality of addressable locations with respect to the reference addressable location.

17. The computer readable medium of claim 16 further comprising:

d) code for storing the correction factors in memory.

18. The computer readable medium of claim 16, wherein the sample substrate is a first sample substrate, and wherein the plurality of different addressable locations is a first plurality of addressable locations, and wherein the medium further comprises:

d) code for applying the correction factors to subsequent time-of-flight values, or values derived from the subsequent time-of-flight values, for analytes on a second plurality of addressable locations on a second sample substrate, wherein the first plurality of addressable locations and the second plurality of addressable locations are at corresponding positions on the first sample substrate and the second sample substrate, respectively.

19. The computer readable medium of claim 16 further comprising:

d) code for determining, for each correction factor, $Tof_X/Tof_R$ for each addressable location on the sample substrate, wherein $Tof_X$ is the time-of-flight value for the calibration substance at an addressable location X on the substrate, wherein X is a variable, and wherein $Tof_R$ is the time-of-flight value for the calibration substance at the reference addressable location R on the sample substrate.

20. A method for calibrating a time-of-flight mass spectrometer, the method comprising:

a) determining time-of-flight values, or values derived from the time-of-flight values for a calibration substance at each of a plurality of different addressable locations on a sample substrate;

b) identifying one of the addressable locations on the substrate as a reference addressable location;

c) calculating a first plurality correction factors for the respective addressable locations on the substrate using the time-of-flight value, or a value derived from the time-of-flight value, for the calibration substance on the reference addressable location, wherein each correction factor in the first plurality of correction factors corrects the time-of-flight value, or the value derived from the time-of-flight value, for the calibration substance on an addressable location within the plurality of addressable locations with respect to the reference addressable location;

d) forming a function using the first plurality of correction factors; and e) estimating a second plurality of correction factors using the function.

21. A computer readable medium comprising:

a) code for determining time-of-flight values for a calibration substance at each of a plurality of different addressable locations on a sample substrate;

b) code for identifying one of the addressable locations on the sample substrate as a reference addressable location;

c) code for calculating a first plurality correction factors for the respective addressable locations on the substrate using the time-of-flight value, or a value derived from the time-of-flight value, for the calibration substance on the reference addressable location, wherein each correction factor in the first plurality of correction factors corrects the time-of-flight value, or the value derived from the time-of-flight values, for the calibration substance on an addressable location within the plurality of addressable locations with respect to the reference addressable location;

d) code for forming a function using the first plurality of correction factors; and e) code for estimating a second plurality of correction factors using the function.

* * * * *